(12) United States Patent
Park et al.

(10) Patent No.: US 11,898,777 B2
(45) Date of Patent: Feb. 13, 2024

(54) AIR CLEANER

(71) Applicant: LG ELECTRONICS INC., Seoul (KR)

(72) Inventors: Sangjin Park, Seoul (KR); Dooyeong Kwak, Seoul (KR); Naehyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 160 days.

(21) Appl. No.: 17/540,325

(22) Filed: Dec. 2, 2021

(65) Prior Publication Data

US 2022/0186950 A1 Jun. 16, 2022

(30) Foreign Application Priority Data

Dec. 14, 2020 (KR) .......... 10-2020-0174405
Jan. 4, 2021 (KR) .......... 10-2021-0000533
Feb. 25, 2021 (KR) .......... 10-2021-0025730

(51) Int. Cl.
B01D 46/00 (2022.01)
F24F 8/10 (2021.01)
F24F 8/22 (2021.01)
F24F 8/80 (2021.01)
F24F 13/28 (2006.01)
F24F 110/64 (2018.01)

(52) U.S. Cl.
CPC ............ F24F 8/22 (2021.01); B01D 46/0002 (2013.01); B01D 46/0005 (2013.01); B01D 46/0027 (2013.01); F24F 8/10 (2021.01); F24F 8/80 (2021.01); F24F 13/28 (2013.01); F24F 2110/64 (2018.01)

(58) Field of Classification Search
CPC ............... B01D 46/00; B01D 46/0002; B01D 46/0005; B01D 46/0027
See application file for complete search history.

(56) References Cited

U.S. PATENT DOCUMENTS

2004/0118289 A1 6/2004 Chang et al.
2016/0114276 A1 4/2016 Yu et al.
(Continued)

FOREIGN PATENT DOCUMENTS

CN 105546664 5/2016
CN 106813315 6/2017
(Continued)

OTHER PUBLICATIONS

Taiwanese Office Action dated Mar. 8, 2023 issued in Application No. 110145530.
(Continued)

Primary Examiner — Robert A Hopkins
(74) Attorney, Agent, or Firm — KED & ASSOCIATES

(57) ABSTRACT

An air cleaner may include a housing including a first housing having a discharge outlet through which air is discharged outside of the air cleaner, and a second housing including a suction inlet through which air is suctioned from outside of the air cleaner, and a filter assembly accommodated inside of the housing and that filters air. The first housing and the second housing may be spaced apart from each other, and the filter assembly may be replaceable through a space between the first housing and the second housing.

21 Claims, 25 Drawing Sheets

(56) References Cited

U.S. PATENT DOCUMENTS

| | | |
|---|---|---|
| 2020/0061231 A1 | 2/2020 | Jeong et al. |
| 2020/0298165 A1 | 9/2020 | Kang et al. |
| 2020/0300502 A1 | 9/2020 | Kang et al. |

FOREIGN PATENT DOCUMENTS

| | | |
|---|---|---|
| CN | 106958873 | 7/2017 |
| CN | 107036197 | 8/2017 |
| CN | 208475513 | 2/2019 |
| CN | 111156622 | 5/2020 |
| CN | 111219809 | 6/2020 |
| CN | 111829090 | 10/2020 |
| DE | 10 2019 201 993 | 8/2020 |
| EP | 1 437 169 | 7/2004 |
| JP | 2019-512078 | 5/2019 |
| KR | 10-2017-0133966 | 12/2017 |
| KR | 102027302 B1 * | 10/2019 |
| KR | 10-2020-0112596 | 10/2020 |

OTHER PUBLICATIONS

Chinese Office Action dated May 11, 2023 issued in Application No. 202111515755.1.
Japanese Office Action dated Nov. 22, 2022 issued in Jp Application No. 2021-199875.
European Search Report dated May 10, 2022 issued in EP Application No. 21213929.9.

* cited by examiner

AIR CLEANER

CROSS-REFERENCE TO RELATED APPLICATION(S)

This application claims the benefit of Korean Patent Application Nos. 10-2020-0174405, filed in Korea on Dec. 14, 2020, 10-2021-0000533, filed in Korea on Jan. 4, 2021 and 10-2021-0025730, filed in Korea on Feb. 25, 2021, which is hereby incorporated by reference as if fully set forth herein.

BACKGROUND

1. Field

An air cleaner is disclosed herein.

2. Background

An air cleaner is an apparatus that suctions and filters polluted air and then discharges filtered air, and is configured to purify an indoor space, such as a home or office. In general, the air cleaner includes a blower configured to suction external air and discharge air, and a filter disposed inside of the blower to filter dust, and bacteria, for example, in the air. The air cleaner may further include a flow converter configured to adjust a discharge direction of the air discharged from the blower.

In recent years, in addition to an indoor air cleaner used in a large space, such as a home or office, a portable air cleaner in a small and light form for easy portability has been developed to purify a small space, such as a studio apartment or an interior of a vehicle. Such a portable air cleaner may be an apparatus suitable for a user who goes out a lot or moves to several places, rather than staying for a long time in one place, such as a home or office, and may have an advantage of being easily carried and easily used by the user at a desired place.

In the case of the generally used indoor air cleaner, a filter replacement portion for replacing a filter accommodated therein may be separately provided. The filter replacement portion may be configured to open and close an opening in a sidewall of an air cleaner housing using various schemes, such as a hinge scheme, or a sliding scheme, for example. That is, in the case of the indoor air cleaner, an opening for filter replacement and a door for filter replacement that opens and closes the opening for the filter replacement are absolutely necessary.

On the other hand, in the case of the general portable air cleaner, the filter replacement portion for replacing the filter accommodated therein is not separately disposed. Accordingly, when a life of the filter is over, there is a problem that the entire portable air cleaner must be replaced.

In U.S. Patent Publication No. 2020/0061231 A1 (hereinafter "related art"), which is hereby incorporated by reference, an air cleaner is disclosed in which an inlet and an outlet are respectively defined at upper and lower portions thereof, and air flowing between the inlet and the outlet is purified through a high efficiency particulate air (HEPA) filter and two light source modules. However, the air purifier according to the related art is an indoor air cleaner used indoors. When it is used to purify an interior of a means of transportation, such as a vehicle, because a suction inlet is formed only at a lower portion thereof, it is difficult to suction air. In addition, as a light source is located between a fan and the filter, an air flow resistance increases. In addition, a filter replacement structure is not separately provided.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the drawings. The following description is provided to provide a comprehensive understanding of a method, an apparatus, and/or a system described herein. However, this is merely an example and embodiments are not limited thereto.

In describing embodiments, when it is determined that description of the related art may unnecessarily obscure the gist, the description thereof has been omitted. In addition, terms to be described later are terms defined in consideration of functions in embodiments, which may vary based on intentions of users and operators, and customs, for example. Therefore, a definition thereof should be made based on a content throughout this specification. The terminology used in the detailed description is for the purpose of describing embodiments only, and should not be limiting. As used herein, the singular forms 'a' and 'an' are intended to include the plural forms as well, unless the context clearly indicates otherwise. It should be understood that the terms 'comprises', 'comprising', 'includes', and 'including' when used herein, specify the presence of the features, numbers, steps, operations, components, parts, or combinations thereof described herein, but do not preclude the presence or addition of one or more other features, numbers, steps, operations, components, or combinations thereof.

In addition, in describing the components of embodiment, terms such as first, second, A, B, (a), (b) may be used. Such terms are only for distinguishing the component from other components, and the essence, order, or order of the component is not limited by the term.

Figure 2:
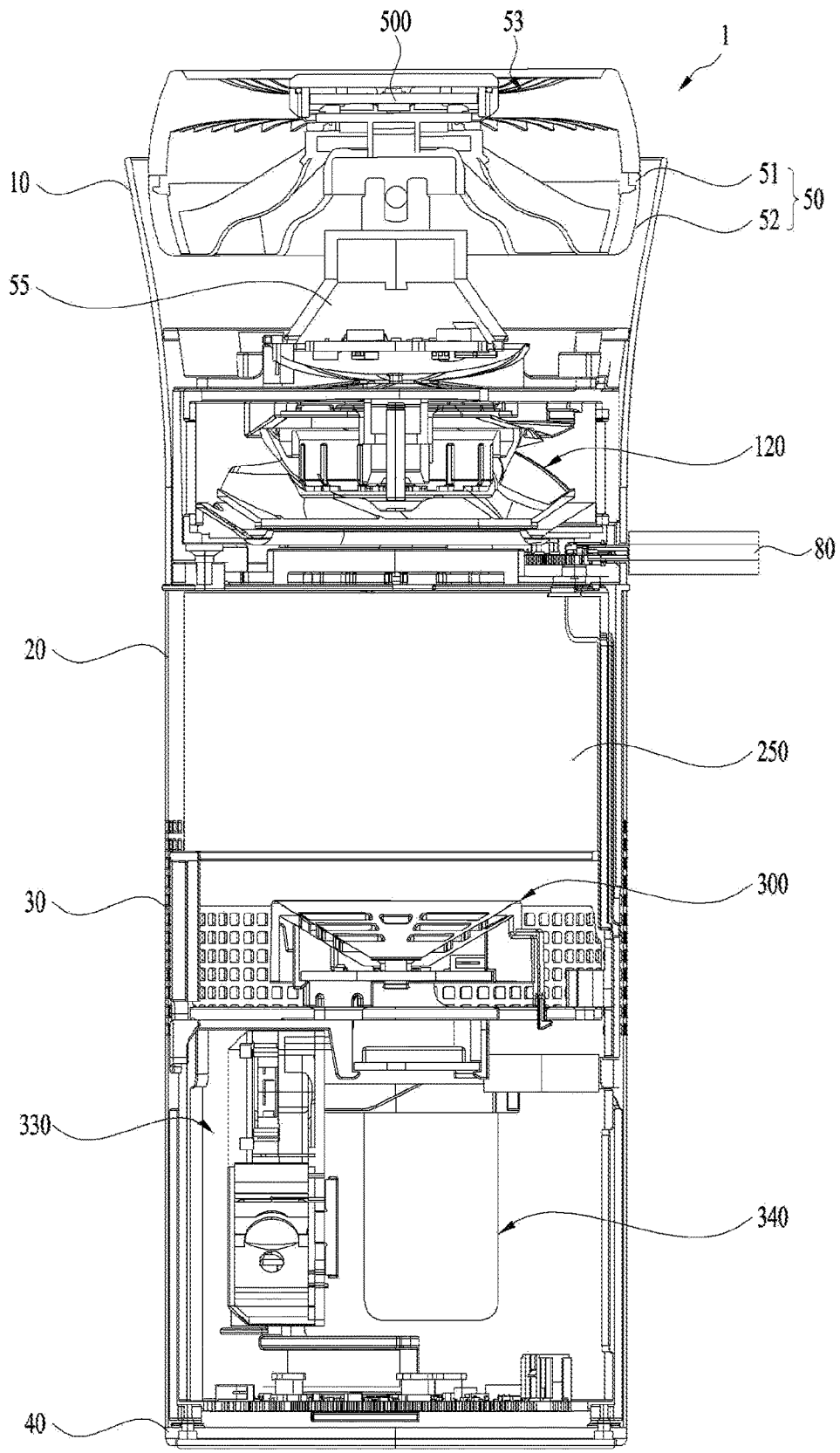
FIG. 2 is a cross-sectional view of the air cleaner of FIG. 1.
Figure 3:
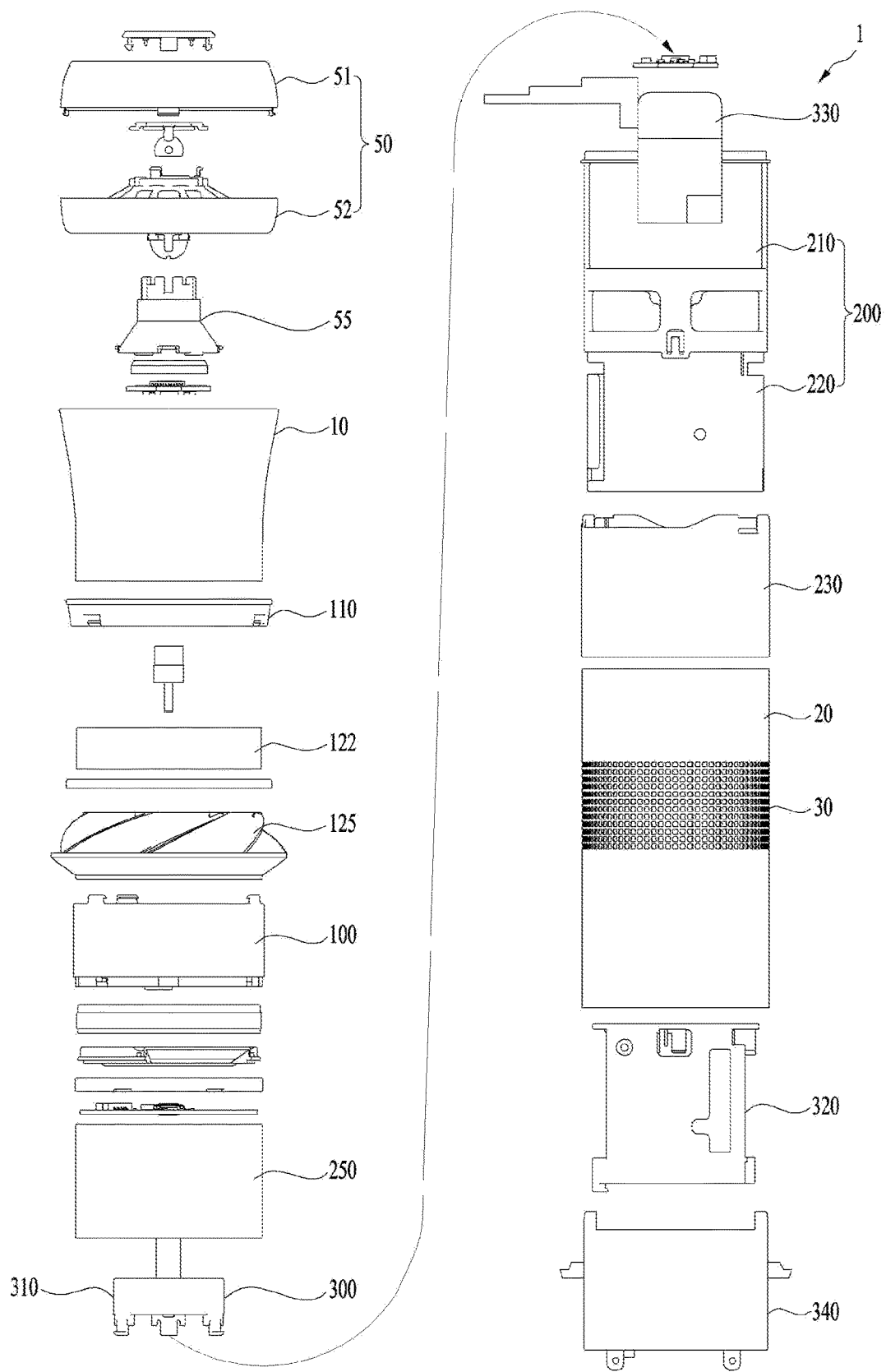
FIG. 3 is an exploded perspective view of an air cleaner according to an embodiment.

Hereinafter, an air cleaner 1 according to an embodiment will be described with reference to FIGS. 1 to 3.

Figure 1:
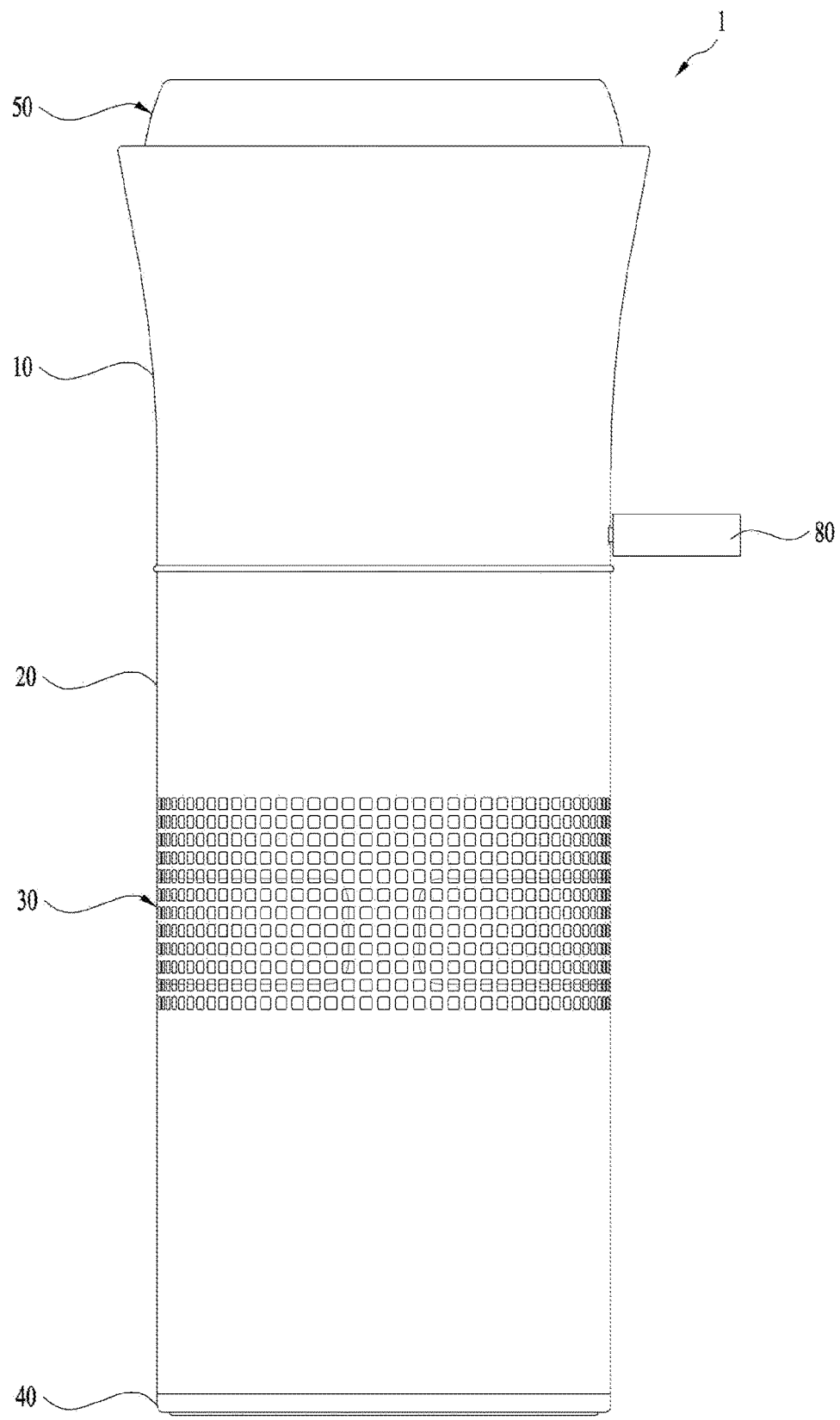
FIG. 1 is a front view of an air cleaner according to an embodiment.

FIG. 1 is a front view of an air cleaner according to an embodiment. FIG. 2 is a cross-sectional view of the air cleaner of FIG. 1. FIG. 3 is an exploded perspective view of an air cleaner according to an embodiment.

The air cleaner 1 may include a housing 10 and 20, a blower 120 that forms an airflow inside of the housing 10 and 20, a filter assembly 250 that purifies air flowing inside of the housing 10 and 20, and a flow converter 50 that discharges purified air. The air cleaner 1 may further include a sterilizer 300 that removes foreign substances contained in the air flowing inside of the housing 10 and 20 or sterilizes the filter assembly 250, a dust sensor assembly 330 that senses dust contained in the suctioned air, and a battery 340 that supplies power to a controller disposed inside of the housing 10 and 20. The controller may include at least one printed circuit board (PCB), and details thereof will be described hereinafter.

The housing 10 and 20 provides therein a space for accommodating internal components, and forms at least a portion of an exterior of the air cleaner 1. As for a shape of the housing 10 and 20, any shape capable of providing the above-described space is sufficient and there is no major limitation. In this embodiment, the housing 10 and 20 includes first housing 10 forming an upper portion and second housing 20 forming a lower portion. The first housing 10 and the second housing 20 together may have a hollow cylindrical shape.

The blower 120, the filter assembly 250, the flow converter 50, the sterilizer 300, the dust sensor assembly 330, and the battery 340 may be located inside of the housing 10 and 20. The housing 10 and 20 may include a suction inlet 30 that provides communication between an exterior and an interior of the housing 10 and 20. The suction inlet 30 may penetrate the housing 10 and 20, and may be formed at a position spaced apart from an upper end and a lower end of the housing 10 and 20. In this embodiment, the suction inlet 30 may be disposed only in the second housing 20 and may not be disposed in the first housing 10. The suction inlet 30 may be formed at a position spaced apart from upper and lower ends of the second housing 20.

Figure 4:
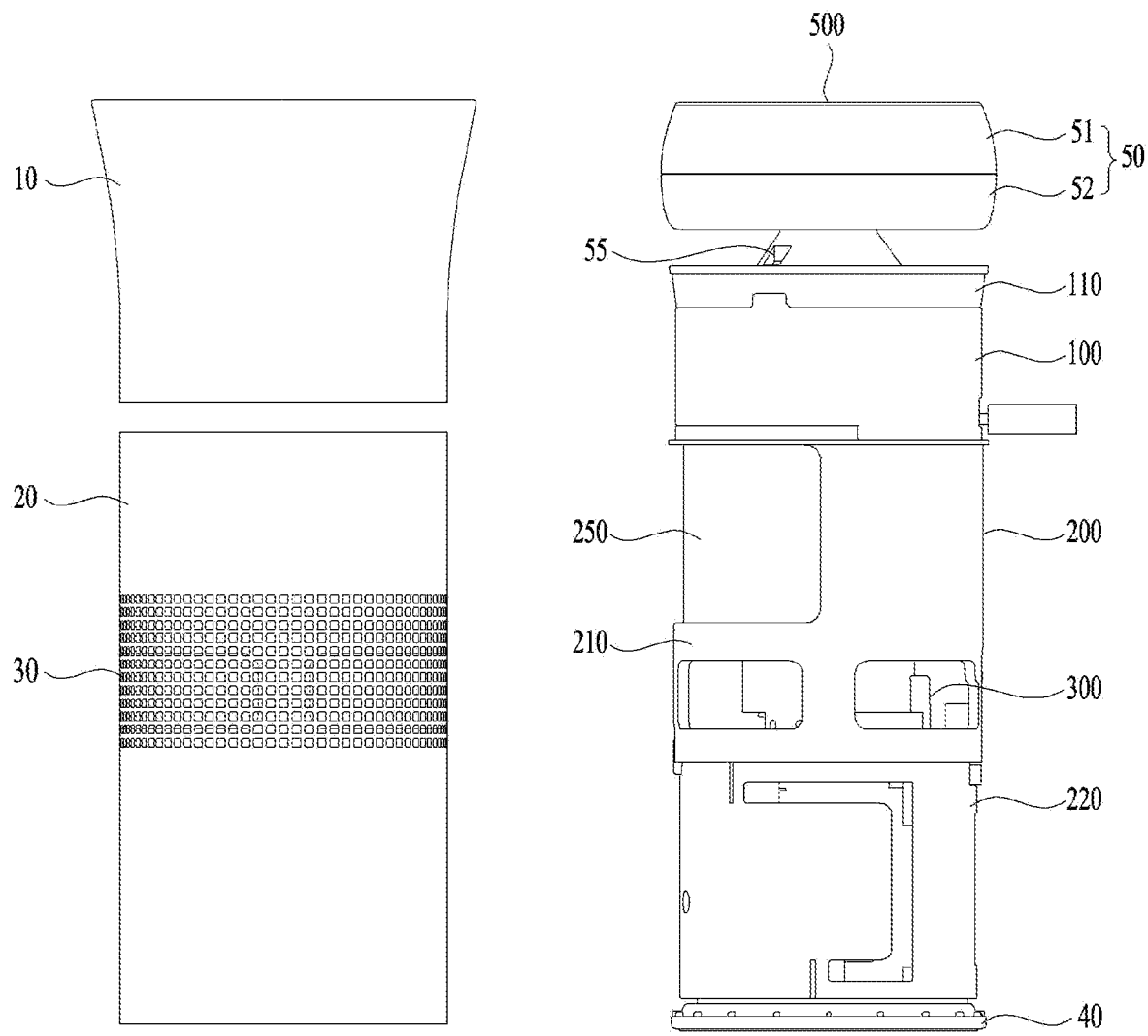
FIG. 4 is a view of a housing and a frame according to an embodiment.
Figure 4:
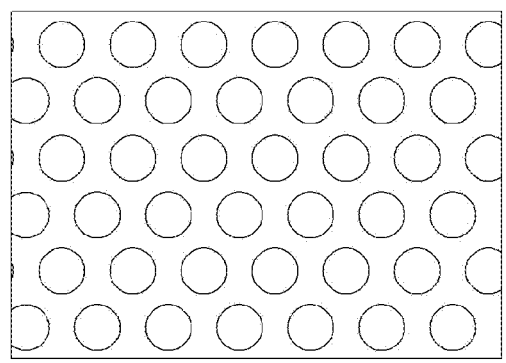

The suction inlet 30 is sufficient as long as it has a shape that communicates the exterior and the interior of the housing 10 and 20 with each other. For example, the suction inlet 30 may include a plurality of through-holes. FIG. 3 and FIG. 4 show an example in which the suction inlet 30 is formed as a plurality of through-holes having a substantially rectangular shape. In this embodiment, the plurality of rectangular through-holes is arranged in a circumferential direction and a heightwise direction of the housing 10 and 20.

Alternatively, the suction inlet 30 may be formed as a plurality of through-holes having a substantially circular shape. When the suction inlet 30 is formed as the circular through-holes, the plurality of circular through-holes may be arranged in the circumferential direction and the heightwise direction.

Alternatively, the suction inlet 30 may be formed in a shape of a slit extending in the heightwise direction of the housing 10 and 20. The slit-shaped through-holes may be arranged in the circumferential direction of the housing 10 and 20, and each slit-shaped through-hole may extend in the heightwise direction of the housing 10 and 20.

Hereinafter, the plurality of circular through-holes or the plurality of rectangular through-holes will be abbreviated as pixel-shaped through-holes for convenience of description. When the suction inlet 30 is formed as the slit-shaped through-holes, an air flow area may be increased compared to a case in which the suction inlet 30 is formed as the pixel-shaped through-holes (under the assumption that an area of the suction inlet is the same). However, when the suction inlet 30 is formed as the slit-shaped through-holes, a degree to which vibration or noise generated inside of the housing 10 and 20 is exposed to the outside by the slit-shaped through-holes may also be increased.

On the other hand, when the suction inlet 30 is formed as the pixel-shaped through-holes, the air flow area may be somewhat lower than that in the case in which the suction inlet 30 is formed as the slit-shaped through-holes. However, when the suction inlet 30 is formed as the pixel-shaped through-holes, a degree to which vibration or the noise generated inside of the housing 10 and 20 is exposed to the outside by the pixel-shaped through-holes may be reduced.

It was identified from experimental data that a degree to which the flow area is lowered (a flow strength of air) as the suction inlet 30 is formed as the pixel-shaped through-holes is lower than a degree to which vibration or noise is increased as the suction inlet 30 is formed as the slit-shaped through-holes. Accordingly, the suction inlet 30 may be formed as the pixel-shaped through-holes rather than as the slit-shaped through-holes. When the suction inlet 30 is formed as the pixel-shaped through-holes, the suction inlet 30 may extend above air inlet 213 from a position overlapping with the air inlet 213 described hereinafter to secure the air flow area.

In addition, the housing 10 and 20 further includes a discharge outlet (not shown) that provides communication between the exterior and the interior of the housing 10 and 20. The discharge outlet may penetrate the housing 10 and 20, and may be formed at an upper end of the housing 10 and 20. In this embodiment, the discharge outlet may be disposed only in the first housing 10 and may not be disposed in the second housing 20. The discharge outlet may be formed at an upper end of the first housing 10, for example, between the first housing 10 and the flow converter 50 described hereinafter.

In embodiments, the suction inlet 30 may have a shape of a grill that at least partially penetrates a sidewall of the second housing 20. The discharge outlet may have a shape of an opening that at least partially penetrates a top surface of the first housing 10.

The flow converter 50 may be in communication with the discharge outlet at the upper end of the first housing 10, and at least a portion of the flow converter 50 may be movably coupled to the first housing 10. The flow converter 50 may include a discharge grill 53 that guides air inside of the housing 10 and 20 outside of the housing 10 and 20.

The flow converter 50 may be located above the suction inlet 30. Therefore, when the blower 120 forms the airflow, air outside of the housing 10 and 20 may be introduced into the housing 10 and 20 through the suction inlet 30 and then discharged outside of the housing 10 and 20 through the discharge outlet and the discharge grill 53.

Frame 100 and 200 that is disposed below the flow converter 50 and accommodates the blower 120, the filter assembly 250, the sterilizer 300, the dust sensor assembly 330, and the battery 340 therein may be disposed inside of the housing 10 and 20.

In this embodiment, the frame 100 and 200 may be include first frame 100 that forms an upper portion and accommodates the blower 120 therein, and second frame 200 that forms a lower portion and accommodates the filter assembly 250, the sterilizer 300, the dust sensor assembly 330, and the battery 340 therein. The first frame 100 and the second frame 200 may have a hollow cylindrical shape together.

A guide support frame 110 may be coupled to a top surface of the first frame 100. A guide 55 that guides a direction of the flow converter 50 may be seated on and coupled to a portion of a top surface of the guide support frame 110.

The filter assembly 250 and the sterilizer 300 may be sequentially stacked inside of the second frame 200. The filter assembly 250 may include a filter capable of removing foreign substances contained in the air, and there may be various filters depending on a type of foreign substance to be removed. For example, the filter may be at least one of a dust filter that removes dust, in the air, a biochemical filter that removes organisms, such as mites, in the air, and a deodorizing filter that removes substances that cause odors, for example, hydrogen sulfide, methyl mercaptan, and trimethylamine.

The filter assembly 250 may be removably secured to the interior of housing 10 and 20. The filter assembly 250 may be located above the suction inlet 30, but below the flow converter 50. Accordingly, air flowing from the suction inlet 30 toward the discharge grill 53 may be purified by the filter assembly 250.

The filter assembly 250 may be located above the suction inlet 30, but below the blower 120. This is because, when the filter assembly 250 is located above the blower 120, air flow formed by the blower 120 may be weakened by the filter assembly 250.

The sterilizer 300 is a component that kills microorganisms contained in the air or fungi remaining in the filter assembly 250, and may be located below the filter assembly 250. This is because not only microorganisms included in the air may be killed before the air flows to the filter assembly 250, but also microorganisms located in the filter assembly 250 may be killed by the sterilizer 300.

The sterilizer 300 may be disposed at a vertical level to overlap with the suction inlet 30. In this case, microorganisms contained in the air flowing into the housing 10 and 20 through the suction inlet 30 may be sterilized first.

The battery 340 may be located below the blower 120, the filter assembly 250, the flow converter 50, and the sterilizer 300. In other words, the battery 340 may be disposed inside of the housing 10 and 20 and at a lower end of the housing 10 and 20. This is generally because of a large weight relative to a same volume (a high density) of the battery 340. In addition, this is because it is possible to stably settle the battery 340 in a specific place after moving the air cleaner 1.

In addition, the battery 340 may be located below the suction inlet 30. In this case, air flowing through the suction inlet 30 may flow upward toward the flow converter 50, so that the air may not pass through the battery 340. When the air cleaner 1 is portable, a strength of the airflow formed by the blower 120 may be restricted. As the battery 340 is positioned below the suction inlet 30, a volume of a space occupied by the blower 120 may be reduced.

Accordingly, air flowing into the housing 10 and 20 through the suction inlet 30 may flow to the filter assembly 250 after being sterilized by the sterilizer 300. The air purified through the filter assembly 250 may pass by the blower 120 and flow from the interior of the housing 10 and 20 to the exterior of the housing 10 and 20 through the discharge grill 53.

Hereinafter, with reference to FIGS. 1 to 4 and FIG. 8, the housing 10 and 20 will be described.

Figure 8:
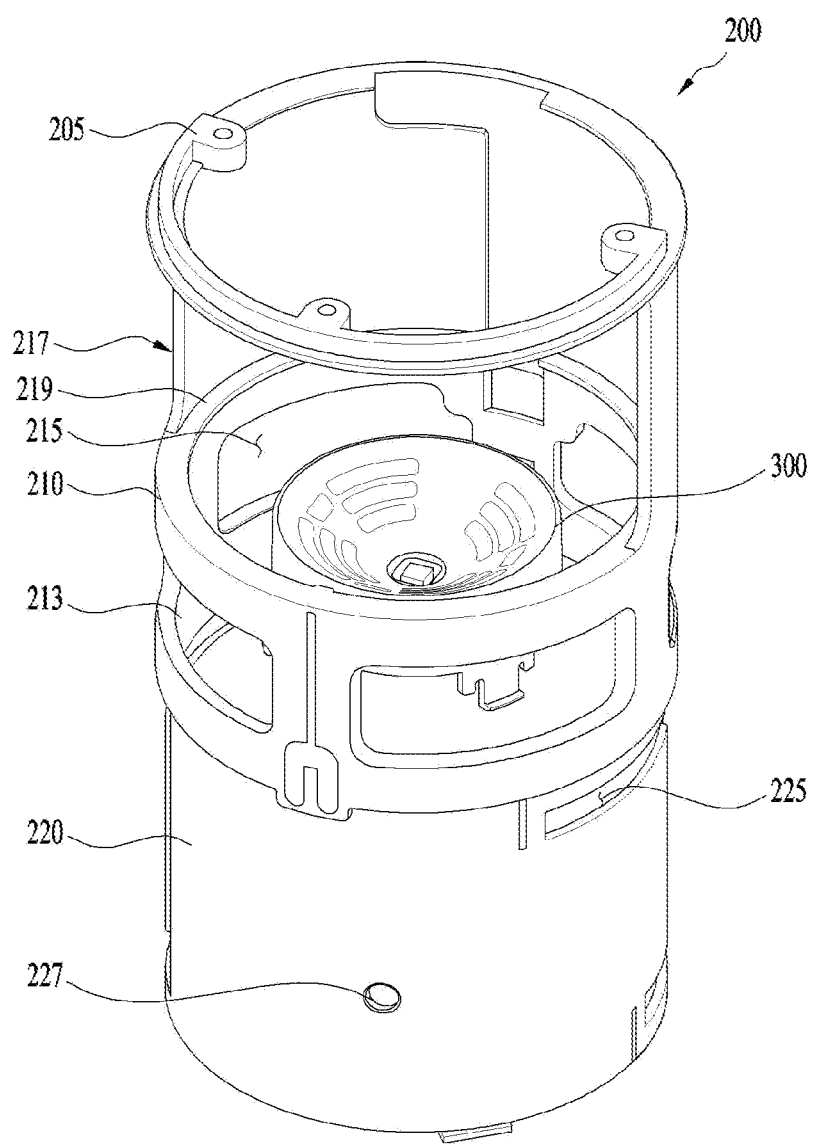
FIG. 8 is a view of a second frame and a sterilizer according to an embodiment.

FIG. 4 is a view of a housing and a frame according to an embodiment. FIG. 8 is a view of a second frame and a sterilizer according to an embodiment.

Referring to FIGS. 1 to 4 and FIG. 8, the housing 10 and 20 may include the first housing 10 and the second housing 20 that form the exterior and respectively the upper and lower portions, and the frame 100 and 200 may include the first frame 100 covered by the first housing 10 and the second frame 200 covered by the second housing 20. At least a portion of the blower 120 and the flow converter 50 may be accommodated in the first frame 100, and the dust sensor assembly 330, the battery 340, the sterilizer 300, and the filter assembly 250 may be accommodated in the second frame 200. The guide 55 disposed between the blower 120 and the flow converter 50 to guide a state change of the flow converter 50, and the guide support frame 110 that supports the guide 55 may be further accommodated in the first frame 100.

The first housing 10 may be movable or detachable relative to the second housing 20. Accordingly, a user may periodically replace the filter assembly 250. In other words, when the first housing 10 and the second housing 20 are separated from each other, the filter assembly 250 may be exposed to the user.

The second housing 20 may be formed in a hollow cylindrical shape. The suction inlet 30 may be disposed at a position spaced apart from a lower end of the second housing 20. This assumes that the air cleaner 1 is disposed in a vehicle. In this case, a smoother air flow may be formed than in a case in which the air cleaner 1 is erected in a component, such as a cup holder.

In other words, the suction inlet 30 may be formed in the shape of the grill partially penetrating the sidewall of the second housing 20 at the position spaced apart from the lower end of the second housing 20. The suction inlet 30 may be sufficient as long as it has a shape that provides communication between the exterior and the interior of the second housing 20 with each other, but the drawings show an example in which the suction inlet 30 is formed as a plurality of through-holes. Each of the plurality of through-holes may be formed in a rectangular shape according to this embodiment.

Because the first housing 10 accommodates therein the flow converter 50 which is configured to be movable, it may have a shape that does not interfere with the movement of the flow converter 50. Thus, the first housing 10 may have a hollow cylindrical shape connected to an upper end of the second housing 20.

At least a portion of the flow converter 50 may be accommodated in an upper portion of the first housing 10 and configured to be movable. At least a portion of the blower 120 may be accommodated in a lower portion of the first housing 10. Accordingly, air passing through the blower 120 may be discharged to the outside of the housing 10 and 20 through the discharge grill 53 which is movable.

The first frame 100 may have a height smaller than a height of the first housing 10, and the second frame 200 may have a height corresponding to a height of the second housing 20. The battery 340, the dust sensor assembly 330, the sterilizer 300, and the filter assembly 250 may be accommodated in the second frame 200. The first frame 100 that accommodates the blower 120 therein may be fastened to a top surface of the second frame 200.

The second frame 200 may include a dust sensor assembly accommodating portion (not shown) and a battery accommodating portion (not shown) disposed at a lower portion of the second frame 200 and respectively accommodating the dust sensor assembly 330 and the battery 340 therein, and may include a filter assembly detachable portion 215 disposed in an upper portion of the second frame 200 and detachably accommodating the filter assembly 250 therein, and a sterilization fastening portion (not shown) disposed between the filter assembly detachable portion 215 and the battery accommodating portion to accommodate the sterilizer 300 therein. In addition, the second frame 200 may further include a frame fastening portion 205 disposed in the upper portion of the second frame 200 to fix the first frame 100 to the second frame 200. The term "accommodating" may refer to being formed at a vertical level to overlap with a component to be accommodated.

The battery accommodating portion may be located at the lower portion of the second frame 200. The frame fastening portion 205 may be located at the upper portion of the second frame 200. The filter assembly detachable portion 215 may be positioned between the battery accommodating portion and the frame fastening portion 205.

The housing 10 and 20 may further include an inner housing 230 for moving the second frame 200 with respect to the second housing 20. The inner housing 230 may be fixed to an inner circumferential surface of the second housing 20, and may be movably coupled to an outer circumferential surface of the second frame 200. More specifically, the inner housing 230 may be fixed to the inner circumferential surface of the second housing 20, and may be movably fixed to an outer circumferential surface of the battery accommodating portion. Accordingly, the second frame 200 may be configured to be movable with respect to the second housing 20. Accordingly, after separating the first housing 10 and the second housing 20 from each other to replace the filter assembly 250, the user may move the second frame 200 with respect to the second housing 20.

The second frame 200 may move upward relative to the second housing 20. In other words, the second housing 10 may move downward relative to the second frame 200. This makes it possible for the filter assembly 250 to be exposed to the user when the first housing 10 and the second housing 20 are separated from each other.

The second frame 200 may further include an air inlet 213 in communication with the suction inlet 30. More specifically, the air inlet 213 may be defined through a portion of the sidewall of the second frame 200. Accordingly, air suctioned by the suction inlet 30 may be introduced into the sterilizer 300 after passing through the air inlet 213.

The air inlet 213 may overlap the suction inlet 30 at least partially. A predetermined height of the suction inlet 30 may be greater than a height of the air inlet 213. Accordingly, the air flowing through the suction inlet 30 may flow through the air inlet 213, and the air passing through the air inlet 213 may be sterilized by the sterilizer 300.

The air inlet 213 is sufficient as long as it has a shape that communicates the interior and the exterior of the second frame 200. The drawings show an example in which the air inlet 213 has a substantially rectangular shape and includes a plurality of air inlets spaced apart from each other in a circumferential direction.

The filter assembly detachable portion 215 may include a filter assembly opening 217 that penetrates or is cut in above the air inlet 213 to provide therein a space in which the filter assembly 250 may move, and a filter assembly fixing rib 219 that fixes the filter assembly 250 located inside of the filter assembly detachable portion 215 through the filter assembly opening 217. The filter assembly opening 217 may be defined by penetrating or being cut in a shape corresponding to a shape of the filter assembly 250.

The filter assembly fixing rib 219 may protrude from an inner circumferential surface of the second frame 200 to fix the filter assembly 250 inserted into the second frame 200. More specifically, the filter assembly fixing rib 219 may protrude inwardly of the second frame 200 from a lower end of the filter assembly opening 217. The frame fastening portion 205 may be disposed at an upper end of the second frame 200 to fix the first frame 100 that accommodates therein the blower 120 to the second frame 200.

Hereinafter, a blower according to an embodiment will be described with reference to FIGS. 4 to 6.

Figure 5A:
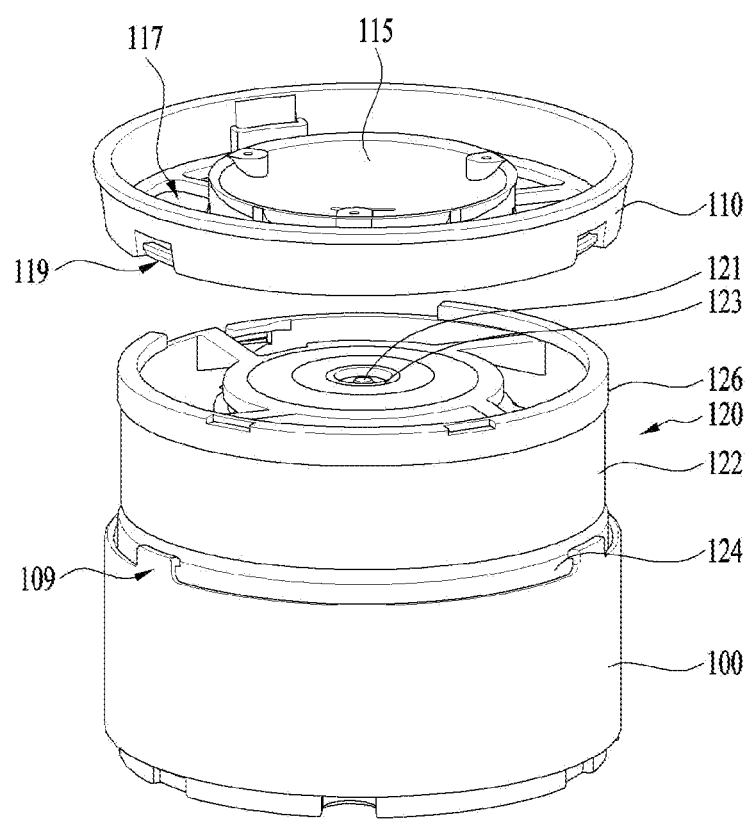
FIGS. 5A-5B are views of a blower according to an embodiment.
Figure 5B:
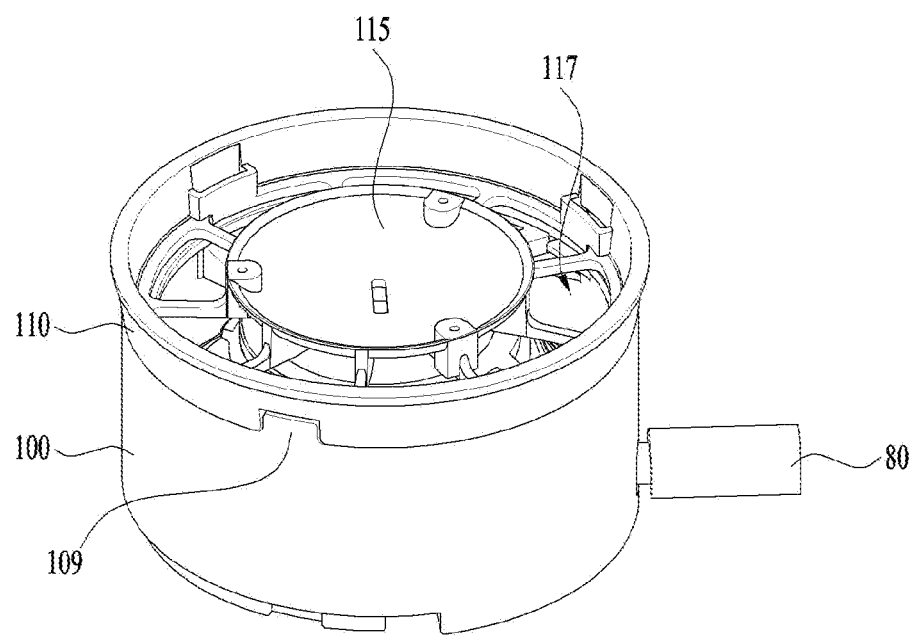
Figure 6:
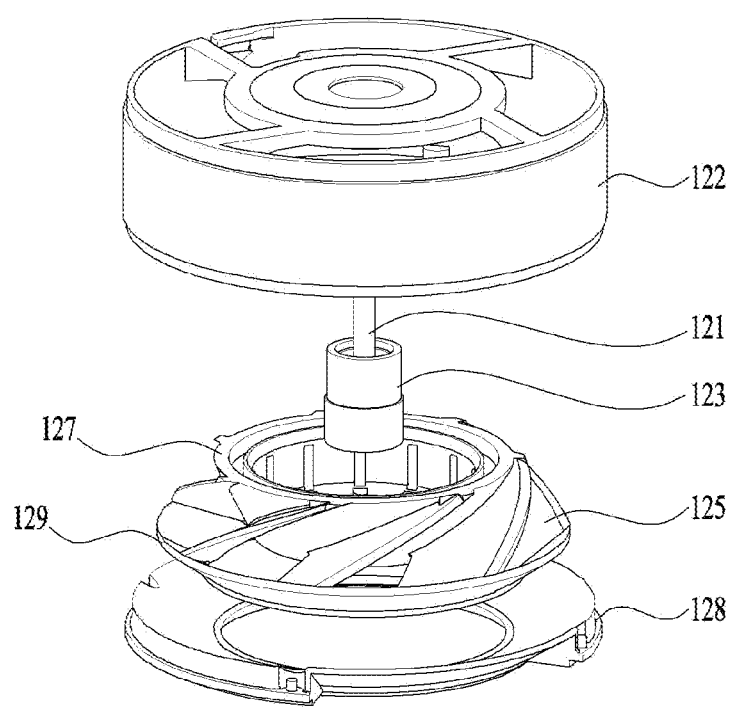
FIG. 6 is a view showing an internal configuration of a blower according to an embodiment.

FIG. 5A-5B are views of a blower according to an embodiment. Referring to FIGS. 5A to 6, blower 120 may include a fan housing, and a fan assembly accommodated in the fan housing. The fan housing may include a main fan housing 122 that forms a whole skeleton, and a fan housing base 128 that supports the main fan housing 122 from the bottom. The fan housing may further include a fan housing coupling portion 126 that couples the main fan housing 122 and the first housing 100 to each other.

The fan housing coupling portion 126 may interconnect the main fan housing 122 and the first housing 100 to each other, and may serve to reduce exposure of vibration and noise generated in the main fan housing 122 to the outside. That is, the fan housing coupling portion 126 may serve as a damper that reduces vibration or noise generated in the main fan housing 122. More specifically, the fan housing coupling portion 126 may include a first damper 126a and a second damper 126b respectively coupled to an upper end and a lower end of the main fan housing 122 to reduce vibration or noise transmitted to the fan housing coupling portion 126.

The first damper 126a and the second damper 126b may be coupled to upper and lower ends of the main fan housing 122, respectively. Therefore, the first damper 126a may block vibration or noise generated in the main fan housing 122 from being transmitted upwards, and the second damper 126b may block vibration or noise generated in the main fan housing 122 from being transmitted downwards.

A damper accommodating portion 1221 and 1223 to which the fan housing coupling portion 126 may be coupled may be disposed in the main fan housing 122. The damper accommodating portion 1221 and 1223 may be recessed from an outer surface of the main fan housing 122 to accommodate the fan housing coupling portion 126 therein.

More specifically, the damper accommodating portion may include first damper accommodating portion 1211 recessed inwardly from an upper end of the main fan housing 122 and fastened to the first damper 126a, and second damper accommodating portion 1223 recessed inwardly from a lower end of the main fan housing 122 and fastened to the second damper 126b.

The fan housing coupling portions 126a and 126b are made of a material that is effective in at least one of vibration absorption, sound insulation, or sound absorption. For example, the fan housing coupling portions 126a and 126b may be made of at least one of plastic, rubber, or silicone. Accordingly, the fan housing coupling portion 126 may minimize vibration and noise generated by the blower 120 from leaking outside of the housing 10 and 20, and may reduce a gap between the main fan housing 122 and the first housing 100, thereby minimizing vibration and noise generated in the main fan housing 122.

The fan assembly may include a hollow hub 127, a shroud 129 spaced apart from the hub 127, and a blade 125 that connects the hub 127 and the shroud 129 to each other. The hub 127, the blade 125, and the shroud 129 may be integrally formed and rotate together. The shroud 129 may be disposed beneath the hub 127 and surround a portion of the hub 127. In other words, a diameter of the hub 127 may be smaller than a diameter of the shroud 129.

The blade 125 may include a plurality of blades, and may extend from an outer circumferential surface of the hub 127 toward the shroud 129. The plurality of blades may be spaced apart from each other at equal spacings along a circumferential direction from the outer circumferential surface of the hub 127.

The plurality of blades may radially extend from the outer circumferential surface of the hub 127 to be connected to the shroud 129. Each blade 125 may extend such that a position thereof is changed in a vertical direction, a lateral direction, and a frontward and rearward direction.

The fan assembly may further include a driver 123 that rotates the hub 127, the blade 125, and the shroud 129, and a shaft 121 that is rotated by the driver. When the driver 123 is provided as a motor, the driver 123 may include a stator that forms a rotating magnetic field, and a rotor that is rotated by the magnetic field formed by the stator, and the shaft 121 may be coupled to the rotor.

The main fan housing 122 may be configured to accommodate the fan assembly from a first side, and the fan housing base 128 may be configured to accommodate the fan assembly from a second side. The fan housing base 128 may be coupled to an end of the main fan housing 122 to rotatably support the fan assembly.

The shaft 121 and the driver 123 may be disposed in the fan housing. More specifically, the shaft 121 and the driver 123 may be disposed in at least one of the main fan housing 122 or the fan housing base 128. Accordingly, the fan assembly may be rotatably disposed inside of the fan housing.

However, when the fan housing is directly connected to the second frame 200, vibration or noise generated by the fan assembly may be easily exposed to the outside. Therefore, in order to reduce exposure of vibration or noise generated in the fan assembly to the outside, the fan housing may be fixed to the second frame 200 by a separate component.

The blower 120 may be accommodated in the first frame 100 and fixed to the second frame 200. More specifically, the first frame 100 may fix the fan housing therein and may be fixed to an upper end of the second frame 200. That is, the first frame 100 may be fixed to the frame fastening portion 205 of the second frame 200.

The first frame 100 may have a height greater than a height in the vertical direction of the fan housing, so that even when the fan housing is fixed therein, the first frame 100 may have free space beneath the fan housing. A universal serial bus printed circuit board (USB PCB) (not shown) connectable to a universal serial bus (USB) 80 may be disposed in the free space.

Accordingly, vibration or noise generated in the fan assembly may not be directly transmitted to the second frame 200. As a result, an amount of vibration or noise generated in the fan assembly leaking to the outside may be reduced.

The blower 120 may further include a discharge fastening frame 240 to couple the flow converter 50 on the blower 120. The discharge fastening frame 240 may be fixed to an upper end of the fan housing 220, so that the flow converter 50 may be positioned on the blower 120.

The guide support frame 110 on which the guide 55 that guides an operation of the flow converter 50 while fixing the fan housing is seated may be coupled to the upper portion of the first frame 100. The first frame 100 and the guide support frame 110 may be coupled to each other in a hook scheme.

The guide support frame 110 may include a support frame body 115 that provides a space for the flow converter 50 and the guide 55 to be seated, a support frame opening 117 that penetrates the support frame body 115, and a support frame recess 119 defined by penetrating a side surface of the support frame body 115.

The support frame opening 117 may be defined in a bottom surface of the support frame body 115 and have a shape corresponding to a shape of a fan housing opening 1220 defined in a top surface of the main fan housing 122. The support frame recess 119 may be fastened with a hook 109 formed at an upper end of the first frame 100. Accordingly, the fan assembly may be fixed to the interior of the fan housing, and the fan housing may be fixed to the interior of the first frame 100.

Hereinafter, a flow converter according to an embodiment will be described with reference to FIGS. 7A-7B.

Figure 7A:
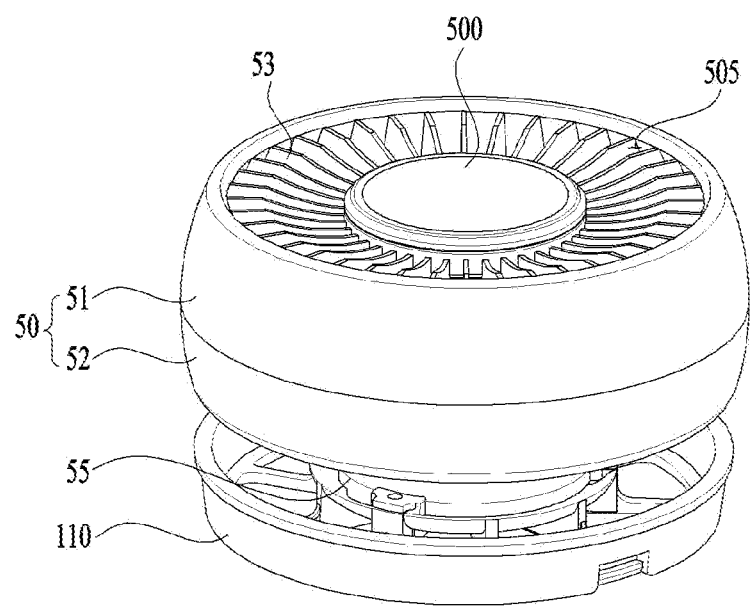
FIGS. 7A-7B are views of a flow converter according to an embodiment.

FIG. 7A is a perspective view of a flow converter according to an embodiment. FIG. 7B is a view in which a discharge housing according to an embodiment is transparently shown.

Figure 7B:
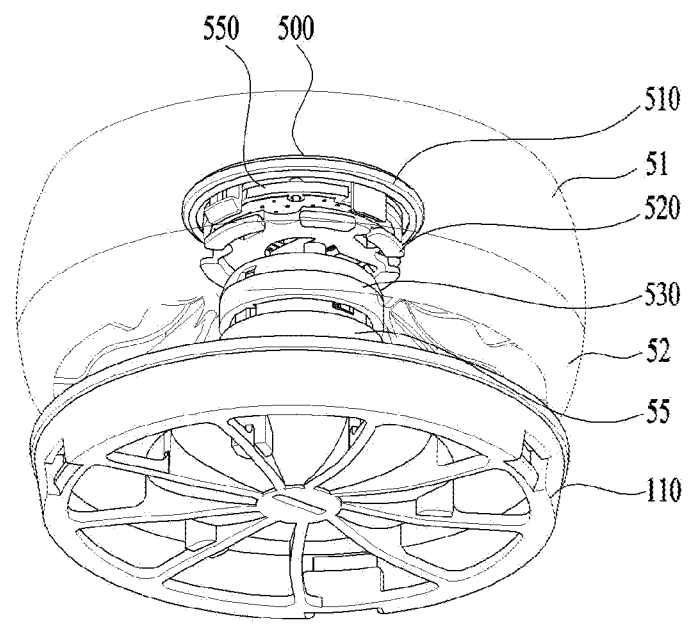

Referring to FIGS. 7A-7B, the guide 55 may be fixed to the support frame body 115 of the guide support frame 110, and the flow converter 50 may be rotatably coupled to the guide 55. More specifically, the flow converter 50 may include discharge housing 51 and 52, a display 500 disposed in the middle of a top surface 505 of the discharge housing 51 and 52, and discharge grill 53 disposed between the display 500 and the discharge housing 51 and 52. The display 500 may also be referred to as a button 500 because the display 500 may also perform the role of a button.

The discharge housing 51 and 52 may include a guide coupling portion 530 disposed therein and rotatably coupled to the guide 55, a button PCB seating frame 520 disposed inside of the discharge housing 51 and 52 and disposed on the guide coupling portion 530 to support a button PCB 710 described hereinafter from the bottom, and a button seating frame 510 disposed on the button PCB seating frame 520 to cover the button PCB 710 and to support the button 500 from the bottom.

The discharge housing 51 and 52 may include first discharge housing 51 that forms an upper portion and second discharge housing 52 that forms a lower portion. The discharge housing 51 and 52 may be spaced apart from the guide support frame 110 by the guide 55. Accordingly, a space required for the discharge housing 51 and 52 to rotate may be defined between the flow converter 50 and the guide support frame 110. Accordingly, interference of the discharge housing 51 and 52 with the blower 120 may be prevented even when the discharge housing 51 and 52 rotates.

The guide coupling portion 530 may be fixed to the guide 55 to rotate the discharge housing 51 and 52. The guide coupling portion 530 may be configured to rotate the discharge housing 51 and 52. For example, the guide coupling portion 530 may be a ball and a ball joint. In this case, the discharge housing 51 and 52 may be rotated or moved at various angles with respect to the guide coupling portion 530.

Hereinafter, with reference to FIGS. 8, 9A-9B, and 19, the sterilizer 300, the dust sensor assembly 330, and the battery 340 according to an embodiment will be described.

Figure 9A:
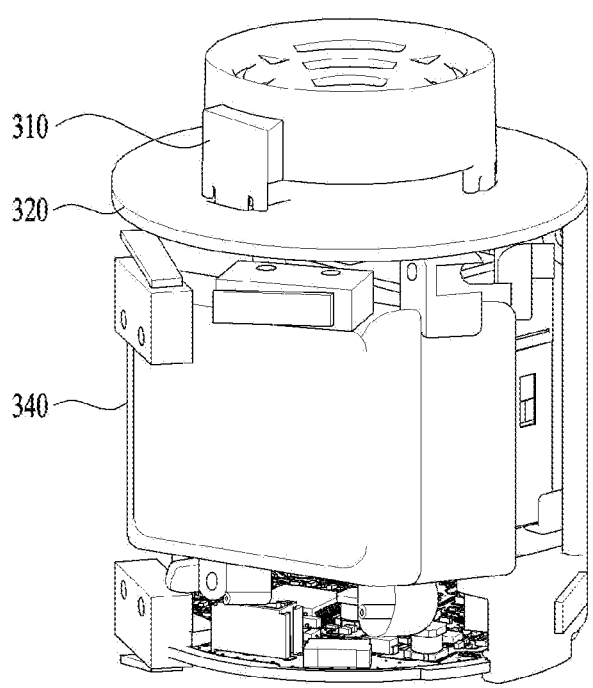
FIGS. 9A-9B are views of a sterilizer, a dust sensor assembly, and a battery according to an embodiment.
Figure 9B:
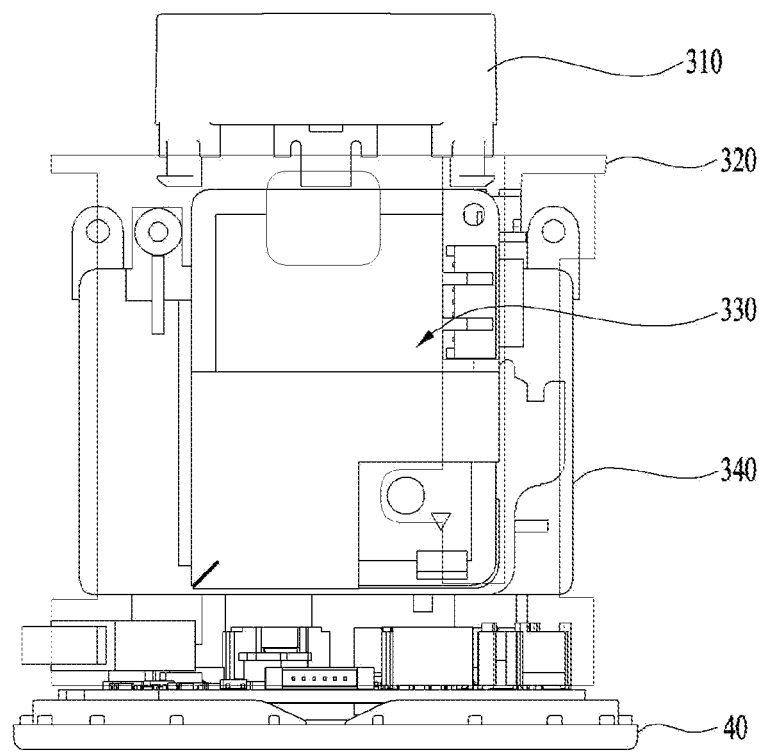
Figure 19:
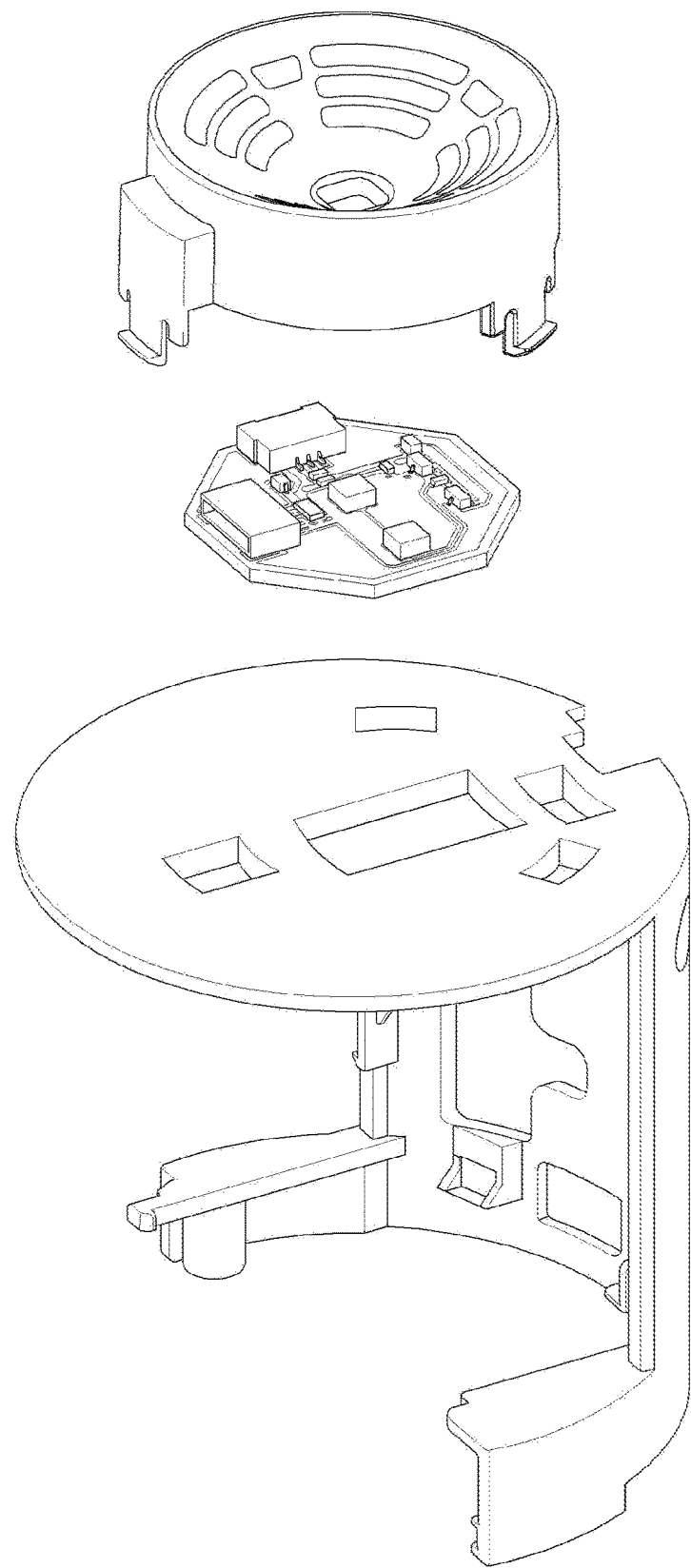
FIG. 19 is an exploded perspective view of a sterilizer according to an embodiment.

FIG. 9A is a view showing a sterilizer and battery according to an embodiment. FIG. 9B is a view showing the sterilizer and a dust sensor assembly 330 according to an embodiment. FIG. 19 is an exploded perspective view of the sterilizer according to an embodiment.

The sterilizer 300 may include a sterilizing light source 350 that generates sterilizing light, a first sterilizer case 310 that accommodates the sterilizing light source 350 therein, and a second sterilizer case 320 coupled to a lower portion of the first sterilizer case 310 to support the first sterilizer case 310 and the sterilizing light source 350.

The first sterilizer case 310 may include a plurality of discharge outlets that provide communication between an interior and an exterior of the first sterilizer case 310. Accordingly, the air introduced through the suction inlet 30 may flow into the first sterilizer case 310 to perform cooling of the sterilizing light source 350. In addition, the sterilizing light generated from the sterilizing light source 350 may be emitted through the plurality of discharge outlets.

The sterilizing light source 350 may include a sterilizer PCB 351 and an irradiation portion 353 mounted on the sterilizer PCB 351. The irradiation portion 353 may be provided as an ultraviolet light emitting diode (UVC LED).

The second sterilizer case 320 may include a top surface frame 321 fastened to the first sterilizer case 310, a side surface frame 323 that extends downward from a circumference of the top surface frame, and a bottom surface frame 325 connected to a lower end of the side frame and facing away from the top surface frame. A plurality of communication holes and a sterilization fastening portion 3217 coupled to the first sterilizer case 310 may be defined in the top surface frame 321. The plurality of communication holes may serve various roles. For example, each of the plurality of communication holes may serve as one of a path for a wire and a path for air flowing through the dust sensor.

More specifically, the top surface frame 321 may include a first communication hole 3211 that is defined through the top surface frame 321 and defines a flow path through which the air flowing through the dust sensor assembly 330 is discharged upward, a second communication hole 3213 that is defined through the top surface frame 321 at a position spaced apart from the first communication hole 3211 and defines a path through which a wire connected to the battery 340 passes, and a third communication hole 3215 that is defined through the top surface frame 321 at a position spaced apart from the second communication hole 3213 and defines a path through which a wire connected to the dust sensor assembly 330 passes.

The second communication hole 3213 and the third communication hole 3215 may be integrally formed (in communication) with each other. Functions of the second communication hole 3213 and the third communication hole 3215 may be changed with each other (for example, the second communication hole may define the path for the wire connected to the dust sensor assembly and the third communication hole may define the path for the wire connected to the battery). In addition, each of the second communication hole 3213 and the third communication hole 3215 may define the path for both the wire connected to the dust sensor assembly 330 and the wire connected to the battery 340.

The dust sensor assembly 330 may be defined as a means for sensing a dust concentration in the air. For example, the dust sensor assembly 330 may include a dust sensor body 331 that forms an appearance thereof, and a dust sensor exposing portion 333 that is defined through the dust sensor body 331 and through which dust flowing through the dust sensor body 331 may be accumulated, a flow path (not shown) defined inside of the dust sensor body 331 to define a flow path of air, a fan (not shown) disposed in the flow path (not shown) to create an airflow in the flow path, and a sensor (not shown) disposed in the flow path (not shown) to sense the concentration of the dust.

A dust sensor inlet 335 that guides air outside of the dust sensor body 331 into the dust sensor body 331, and a dust sensor outlet (not shown) that guides the air inside of the dust sensor body 331 to the outside of the dust sensor body 331 may be disposed at each end of the flow path (not shown). The flow path (not shown) may be defined at a position in communication with but separate from the dust sensor exposing portion 333. In addition, at least some of the dust contained in the air positioned in the air flowing through the flow path (not shown) may be accumulated in the dust sensor exposing portion 333.

The dust sensor body 331 may be formed in various shapes. FIG. 9B shows a shape in which the dust sensor body 331 has an inclined surface 3311 as an example. The inclined surface 3311 may be inclined downward Inwardly at a lower portion of the dust sensor body 331. The dust sensor outlet (not shown) may be in communication with the first communication hole 3211.

The dust sensor assembly accommodating portion and the battery accommodating portion may be disposed inside of the second sterilizer case 320. Accordingly, the dust sensor assembly 330 and the battery 340 may be accommodated in the second sterilizer case 320 below the second frame 200.

That is, a plurality of cutouts for accommodating the dust sensor assembly 330 and the battery 340 therein may be defined in the side surface frame 323. More specifically, an accommodating cutout 3231 cut such that the dust sensor assembly 330 and the battery 340 may be more easily coupled to an interior of the second sterilizer case 320 may be defined in the side surface frame 323.

A cleaning cutout 3233 that is cut or penetrates at a position corresponding to the dust sensor exposing portion 333 to provide communication between the dust sensor exposing portion 333 with the outside of the side surface frame 323 may be defined in the side surface frame 323. In addition, a communication cutout 3235 that is cut or penetrated at a position corresponding to the dust sensor inlet 335 to provide communication between the dust sensor inlet 335 with the outside of the side surface frame 323 may be defined in the side surface frame 323.

The accommodating cutout 3231 may be defined at a position spaced apart from at least one of the cleaning cutout 3233 or the communication cutout 3235.

The cleaning cutout 3233 and the communication cutout 3235 may be spaced apart or connected to each other depending on a position of the dust sensor exposing portion 333 and the dust sensor inlet 335. FIG. 19 shows an example in which the cleaning cutout 3233 is positioned above the communication cutout 3235.

Accordingly, air located outside of the dust sensor body 331 may flow into the dust sensor body 331 through the dust sensor inlet 335. After a concentration of the air flowing into the dust sensor body 331 is sensed by the sensor (not shown), the air may be discharged outside of the dust sensor body 331 through the dust sensor outlet (not shown).

The air flowing through the interior of the dust sensor body 331 may be discharged to the outside and communicate with the sterilizing light source 350. In other words, the first communication hole 3211 may communicate with the interior of the first sterilizer case 310.

For the aforementioned case (in which the first communication hole and the first sterilizer case are in communication with each other), the sterilization fastening portion 3217 may be defined outward (facing toward the housing) of the first communication hole 3211. This is because, when the first communication hole 3211 is located inward of the sterilization fastening portion 3217, the air flowing through the interior of the dust sensor body 311 may communicate with the interior of the first sterilizer case 310, and the air located inside of the first sterilizer case 310 may be sterilized and flow upward (flow toward the filter).

For example, as described above, the blower 120 forms the airflow that guides the air upward. Accordingly, most of the air flowing into the housing 10 and 20 through the suction inlet 30 may flow upwards and only a portion of the air may flow downwards. In other words, even when a separate fan (not shown) is disposed inside of the dust sensor body 331, a component that guides the air to the dust sensor inlet 335 is required.

Thus, a guide 327 that guides the air to the dust sensor inlet 335 may be disposed on an inner surface of the second sterilizer case 320. The guide 327 may be defined as a component that communicates the outside of the second sterilizer case 320 with the dust sensor inlet 335.

The guide 327 may be coupled to an inner surface of the side surface frame 323 to face the interior and guide the air outside the side surface frame 323 to the dust sensor inlet 335. Further, the guide 327 may be in contact with the dust sensor body 331 and the side surface frame 323 to guide the air outside of the side surface frame 323 to the dust sensor inlet 335.

There is no limitation on a shape of the guide 327, but a shape of the dust sensor body 331 should result in the guide 327 being in close contact with the dust sensor body 331. As described above, when the dust sensor body 331 includes the inclined surface 3311, the guide 327 may have a shape corresponding to that of the inclined surface 3311.

More specifically, the guide 327 may include a contact guide 3271 that protrudes inward from the inner surface of the side surface frame 323 and capable of being in contact with the dust sensor body 331 except for the inclined surface 3311, and a flow path guide 3273 that is inclined downward inwardly from the contact guide 3271 and capable of being in contact with the inclined surface 3311. At least one of the contact guide 3271 or the flow guide 3273 may surround the communication cutout 3235.

As described hereinafter, as the airflow formed by the blower 120 is directed upward, an amount of air flowing through the battery 340 is reduced, so that efficiency of the airflow is improved. Thus, the dust sensor assembly 330 may more easily determine the concentration of dust by the guide 327.

Figure 10A:
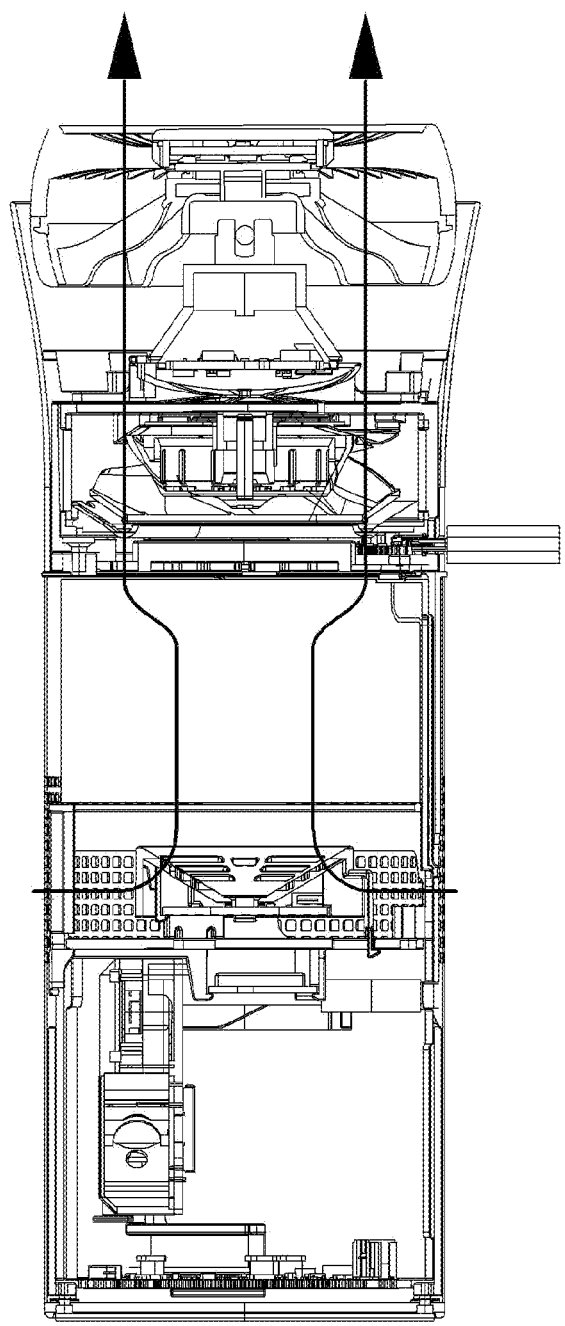
FIGS. 10A-10B are views showing airflow formed inside of an air cleaner according to an embodiment.
Figure 10B:
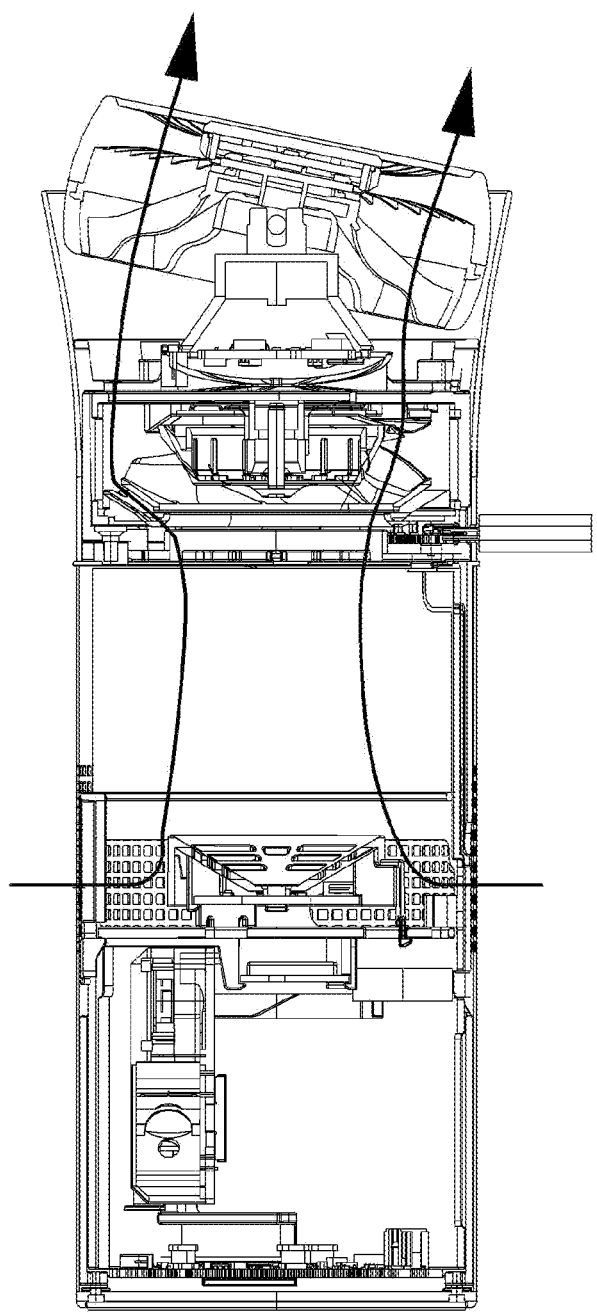

Hereinafter, an overall direction of the air flow and PCBs will be described with reference to FIGS. 10A-10B. FIGS. 10A-10B are views showing air flow in a state in which the flow converter is not rotated and in a state in which the flow converter is rotated.

As described above, the suction inlet 30 may be located spaced apart from the lower end of the second housing 20. Accordingly, air located outside of the housing 10 and 20 may flow into the housing 10 and 20 through the suction inlet 30.

The air flowing into the housing 10 and 20 through the suction inlet 30 may be sterilized by the sterilizer 300. The air flowing through the sterilizer 300 may flow upward after cooling the sterilizer PCB included in the sterilizer light source 350. That is, the air sterilized by the sterilizer 300 may flow toward the blower 120 within the housing 10 and 20. Foreign substances, such as the dust, may be removed from the air flowing toward the blower 120 by the filter assembly 250.

The air flowing through the blower 120 may flow upward toward the flow converter 50. A position of the discharge grill 53 may be changed depending on whether the flow converter 50 is moved, and the air passing through the blower 120 may flow toward the discharge grill 53 whose position is changed. Accordingly, the air introduced through the suction inlet 30 may flow upward and be discharged to the outside through the discharge grill 53.

As described above, the air is introduced through the suction inlet 30 and flows upward, so that a volume of air passing through the battery 340 is somewhat reduced. Therefore, it is possible to efficiently purify the air even by a limited airflow forming force of the blower 120 in the portable air cleaner 1.

The air cleaner 1 according to an embodiment may further include a plurality of PCBs in addition to the sterilizer PCB. For example, the button 500 that receives an input from the user may be disposed at an upper end of the flow converter 50. In this case, a button PCB that processes information input to the button 500 may be disposed below the button 500. In addition, when a function, such as displaying information or lighting, is added to the button 500, a display PCB that controls the display function may be further provided.

As described above in FIGS. 5A-5B, when the USB 80 is inserted into the air cleaner 1, a utility PCB that processes information input from the USB may be provided. In addition, as described above in FIG. 8, the sterilizer PCB that controls the sterilizer 300 may be disposed. Also, the battery 340 may have an electric PCB that supplies power to the above-described PCBs.

The button PCB, the display PCB, the utility PCB, the sterilizer PCB, and the electric PCB may be arranged from top to bottom in the order described. The battery 340 may be connected to at least one of the above-described PCBs through a wire to supply power.

For example, in a case of the display PCB, the utility PCB, the sterilizer PCB, and the electric PCB, disconnection of the wire is not a problem even when being directly connected to the battery 340. However, when the button PCB is directly connected to the battery 340, a position thereof is inevitably changed based on movement of the flow converter 50, so that disconnection of the wire may be a problem.

In order to solve the above problem, in one embodiment, a scheme in which the power is supplied to the display PCB through the battery 340 and the button PCB is supplied with the power from the display PCB is adopted.

Hereinafter, the second housing 200 and an internal configuration thereof according to an embodiment will be described with reference to FIG. 11.

Figure 11:
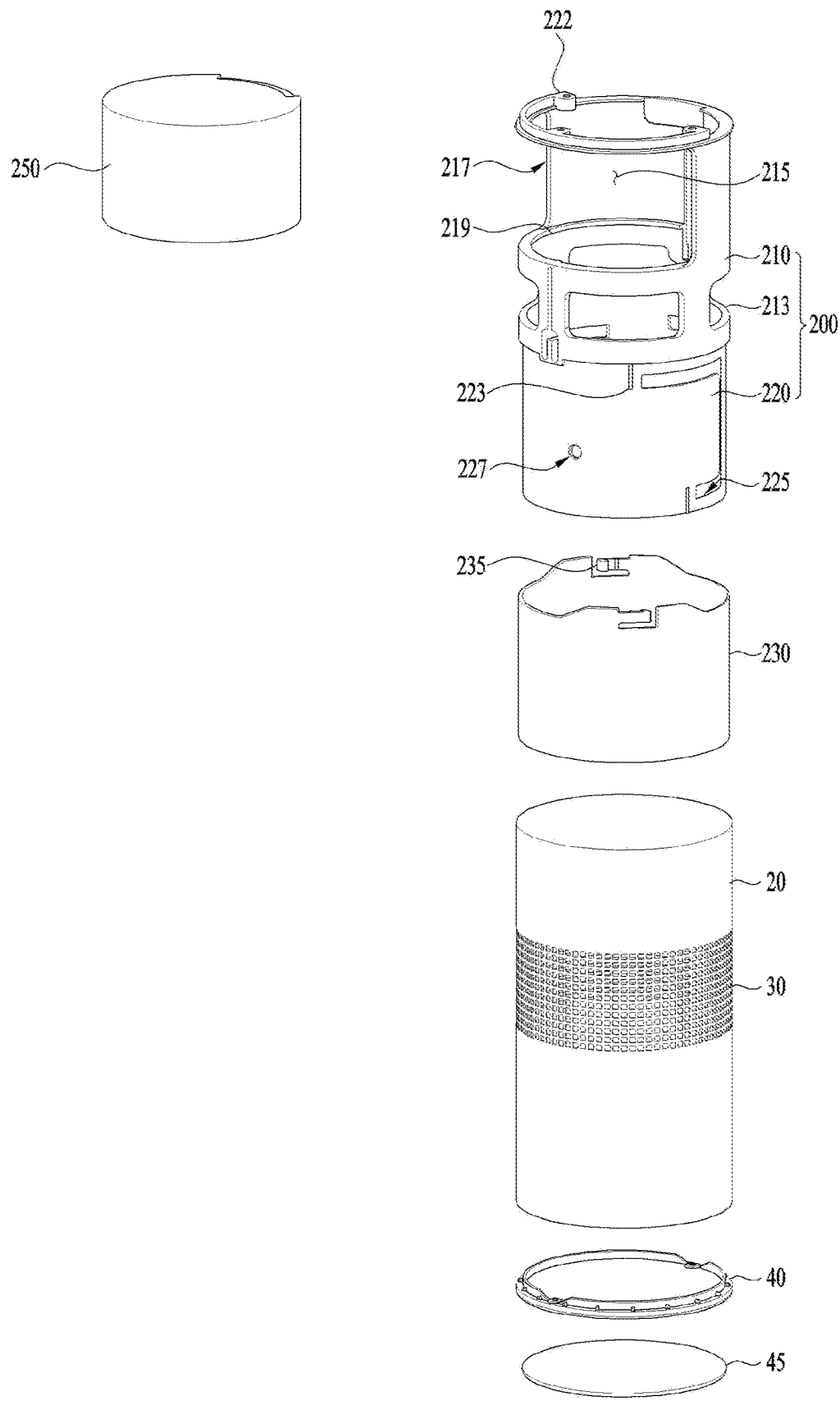
FIG. 11 is an exploded perspective view of a second housing according to an embodiment.

FIG. 11 is an exploded perspective view of a second housing according to an embodiment. Referring to FIG. 11, second frame 200 including second upper frame 210 forming the upper portion and second lower frame 220 forming the lower portion may be accommodated inside of the second housing 20 included in the air cleaner 1 according to embodiments, and inner housing 230 may be interposed between the second housing 20 and the second lower frame 220.

Filter assembly detachable portion 215 through which filter assembly 250 is detachable may be defined inside of the second upper frame 210. The filter assembly detachable portion 215 may include filter assembly opening 217 that provides a space in which the filter assembly 250 is moveable, and filter assembly fixing rib 219 that fixes the filter assembly 250. The filter assembly opening 217 may be defined through a sidewall of the second upper frame 210, and may be located above air inlet 213 in communication with suction inlet 30 of the second housing 20.

Although not shown, sterilizer 300 may be disposed beneath the filter assembly 250. At least a portion of the first sterilizer case 310 that accommodates therein the sterilizer light source 350 may be disposed inside of the second upper frame 210 at a position corresponding to the air inlet 213, and the second sterilizer case 320 included in the sterilizer 300 may be disposed in the second lower frame 220 at a position lower than the air inlet 213.

A lower portion of the second housing 20 may be coupled to base 40, so that the second housing 20 may be supported by the base 40. The inner housing 230 may also be coupled and fixed to the base 40. That is, the second housing 20 and the inner housing 230 may be fixedly coupled to the base 40 together and may be prevented from being separated from each other. Description thereof will be provided hereinafter with reference to FIG. 14.

An anti-slip portion 45 may be further disposed on a bottom surface of the base 40. An entirety of the bottom surface of the base 40 and an entirety of a top surface of the anti-slip portion 45 may be coupled to each other.

The inner housing 230 may be fixed to an inner circumferential surface of the second housing 20, and may be movably coupled to an outer circumferential surface of the second frame 200. The second frame 200 may be configured to move, by sliding of the inner housing 230, in a direction (hereinafter, may be referred to as a "first direction") toward the flow converter 50 (see FIG. 3) or in a direction (hereinafter, referred to as a "second direction") away from the flow converter 50 (see FIG. 3) within the second housing 20.

Therefore, when the inner housing 230 moves or slides in the first direction along the outer circumferential surface of the second lower frame 220, a portion of the second frame 200 may be withdrawn from the second housing 20 upwards. Accordingly, the filter assembly 250 accommodated inside of the second lower frame 220 may be disposed in a state of being exposed to the outside and replaceable.

In contrast, when the inner housing 230 moves or slides in the second direction along the outer circumferential surface of the second lower frame 220, a portion of the second frame 200 may be introduced into the second housing 20. Accordingly, the filter assembly 250 accommodated inside of the second lower frame 220 may be covered by the second housing 20 so as not to be exposed to the outside.

A sliding groove 225 may be defined in an outer wall of the second lower frame 220, and a sliding portion 235 may be formed at the upper end of the inner housing 230. The inner housing 230 may be configured to be slidable with respect to the outer wall of the second lower frame 220 as the sliding portion 235 moves along the sliding groove 225.

In addition, a sliding fastening groove 223 may be further defined in the outer wall of the second lower frame 220, and a sliding fastening portion 233 may be further formed at the upper end of the inner housing 230. As the sliding fastening portion 233 is fastened to the sliding fastening groove 223, the inner housing 230 may be fixed so as not to slide against the outer wall of the second lower frame 220.

For example, first dust sensor cleaning hole 227 may be defined in the outer wall of the second lower frame 220. Accordingly, a portion of the dust sensor assembly 330 accommodated inside of the second lower frame 220 may be exposed to the outside of the second lower frame 220.

The dust sensor exposing portion 333 may communicate with the first dust sensor cleaning hole 227. Accordingly, a portion of the dust sensor assembly 330, that is, the dust sensor, may be exposed to the outside of the second sterilizer case 320 and the second lower frame 220 through the dust sensor exposing portion 333 and the first dust sensor cleaning hole 227. Thereafter, the dust sensor may be exposed to the outside of the inner housing 230 and the second housing 20 through the second dust sensor cleaning hole 237 (see FIG. 17) and the third dust sensor cleaning hole 27 (see FIG. 18).

Hereinafter, with reference to FIGS. 12 and 13, a structure for sliding of the inner housing 230 and the second lower frame 220 according to an embodiment will be described.

Figure 12:
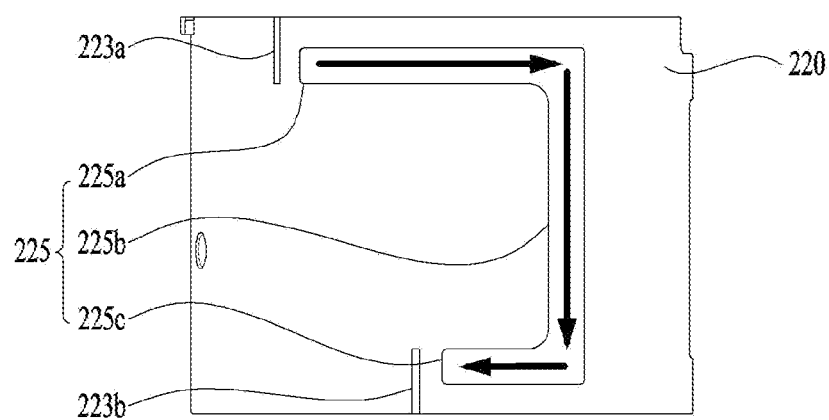
FIG. 12 is a view showing a sliding groove and a sliding fastening groove according to an embodiment.

FIG. 12 is a view showing a sliding groove and a sliding fastening groove according to an embodiment. FIG. 13 is a view showing a sliding portion and a sliding fastening portion according to an embodiment.

Figure 13:
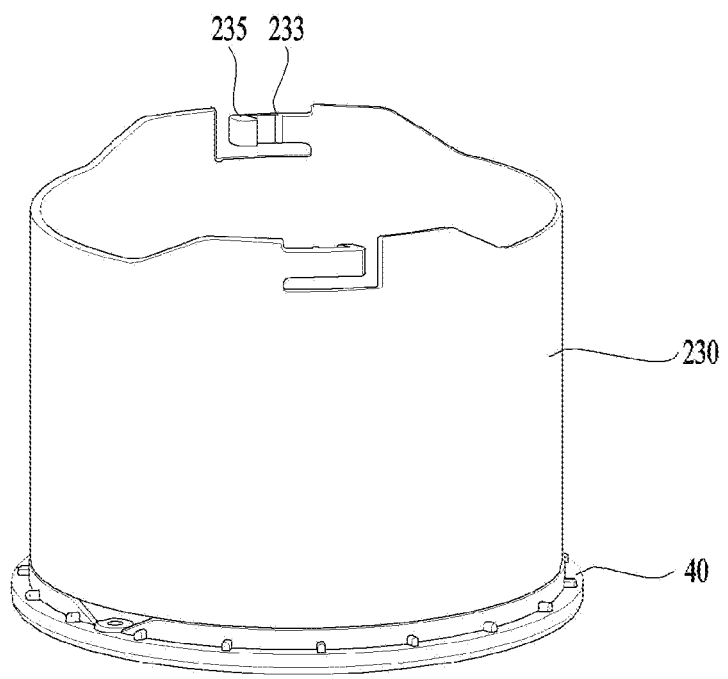
FIG. 13 is a view showing a sliding portion and a sliding fastening portion according to an embodiment.

Referring to FIGS. 12 and 13, the second lower frame 220 may include the sliding groove 225 defined through the sidewall thereof, and the sliding groove 225 may include a plurality of sliding grooves that extends in different directions. More specifically, the sliding groove 225 may include first sliding groove 225a that extends along the circumferential direction of the second lower frame 220, second sliding groove 225b that extends in the first direction or the second direction, and third sliding groove 225c that extends along the circumferential direction of the second lower frame 220 and spaced apart from the first sliding groove 225a.

One or a first end of the first sliding groove 225a may be connected to one or a first end of the second sliding groove 225b, so that the first sliding groove 225a and the second sliding groove 225b may communicate with each other. One or a first end of the third sliding groove 225c may be connected to the other or a second end of the second sliding groove 225b, so that the third sliding groove 225c and the second sliding groove 225b may communicate with each other. That is, the first to third sliding grooves 225a, 225b, and 225c may extend continuously.

An extension length of the first sliding groove 225a and an extension length of the third sliding groove 225c may be different from each other. For example, the extension length of the first sliding groove 225a may be greater than the extension length of the third sliding groove 225c.

Further, an extension length of the second sliding groove 225b may be equal to or greater than a height of the filter assembly 250. This is because, when the extension length of the second sliding groove 225b is smaller than the height of the filter assembly 250, the filter assembly 250 is not completely exposed to the outside, so that replacement of the filter assembly 250 may be difficult.

FIG. 12 shows that sliding groove 225 includes three sliding grooves 225a, 225b, and 225c; however, embodiments are not limited thereto. That is, the sliding groove 225 may include more or less than three sliding grooves. In addition, extending directions of the sliding grooves 225a, 225b, and 225c may also be changed so as not to be vertical or horizontal.

The second lower frame 220 may further include the sliding fastening groove 223 defined as a portion of the outer wall of the second lower frame 220 is concavely recessed or convexly protruded. The sliding fastening groove 223 may include a plurality of sliding fastening grooves disposed at positions spaced apart from each other.

More specifically, the sliding fastening groove 223 may include first sliding fastening groove 223a defined at an upper portion of the outer wall of the second lower frame 220, and second sliding fastening groove 223b defined at a lower portion of the outer wall of the second lower frame 220. The first sliding fastening groove 223a may be defined adjacent to the first sliding groove 225a, and the second sliding fastening groove 223b may be defined adjacent to the third sliding groove 225c. At least a portion of the first sliding fastening groove 223a may extend in parallel with the first sliding groove 225a, and at least a portion of the second sliding fastening groove 223b may extend in parallel with the third sliding groove 225c.

Although FIG. 12 shows that the sliding fastening groove 223 includes the two sliding fastening grooves 223a and 223b; embodiments are not limited thereto. That is, the sliding fastening groove 223 may include more or less than two sliding grooves.

For example, the inner housing 230 may further include the sliding portion 235 configured to be movable along the sliding groove 225, and the sliding fastening portion 233 configured to be fastened to the sliding fastening groove 223. The sliding portion 235 and the sliding fastening portion 233 may protrude from an inner wall of the inner housing 230 toward the interior of the inner housing 230. The sliding portion 235 and the sliding fastening portion 233 may extend in parallel with each other.

Hereinafter, a coupling structure of the inner housing 230 and the base 40 and a coupling structure of the second housing 20 and the base 40 according to an embodiment of the present disclosure will be described with reference to FIG. 14.

Figure 14:
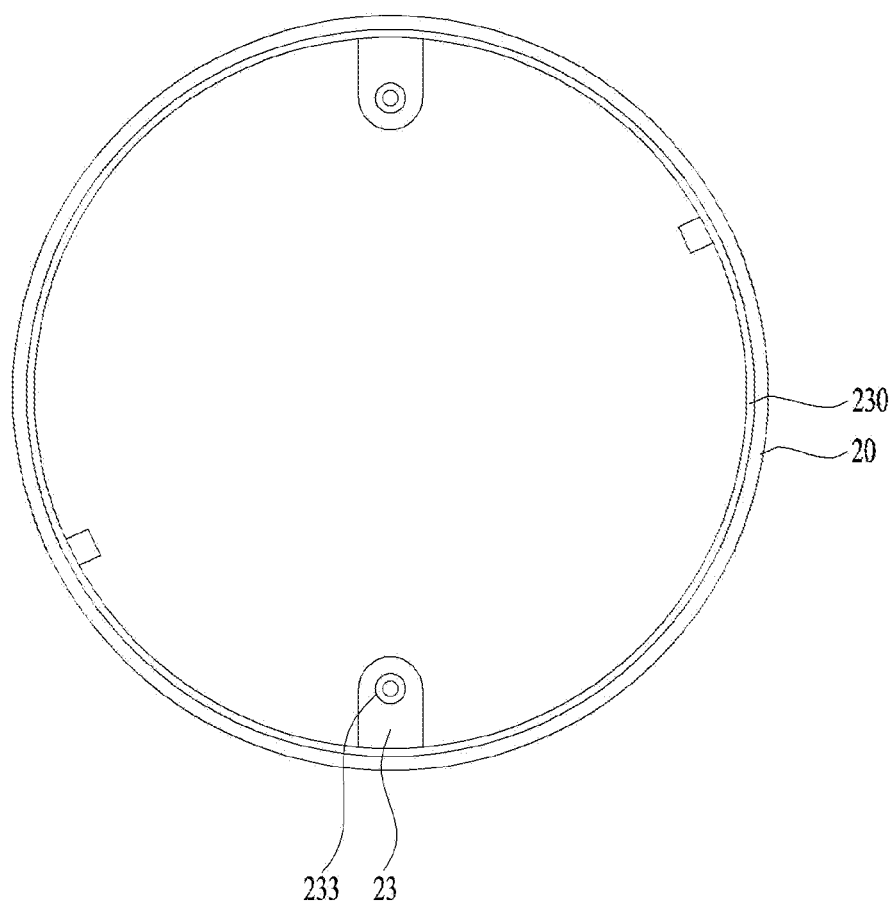
FIG. 14 is a view of a lower portion of an inner housing according to an embodiment.

FIG. 14 is a view showing a lower portion of an inner housing according to an embodiment. Referring to FIG. 14, second housing 20 may include a first base coupling portion 23 that protrudes inward from a lower portion of the sidewall of the second housing 20, and the inner housing 230 may include a second base coupling portion 233 that protrudes inward from a lower portion of the sidewall of the inner housing 230. The first base coupling unit 23 and the second base coupling unit 233 may be disposed to overlap each other, and then may be sequentially coupled to the base 40. Accordingly, the second housing 20 and the inner housing 230 may be prevented from being rotated independently while being fixed to the base 40.

Hereinafter, a state change resulting from sliding of the inner housing 230 and the second lower frame 220 according to an embodiment will be described with reference to FIGS. 15A-15C.

Figure 15A:
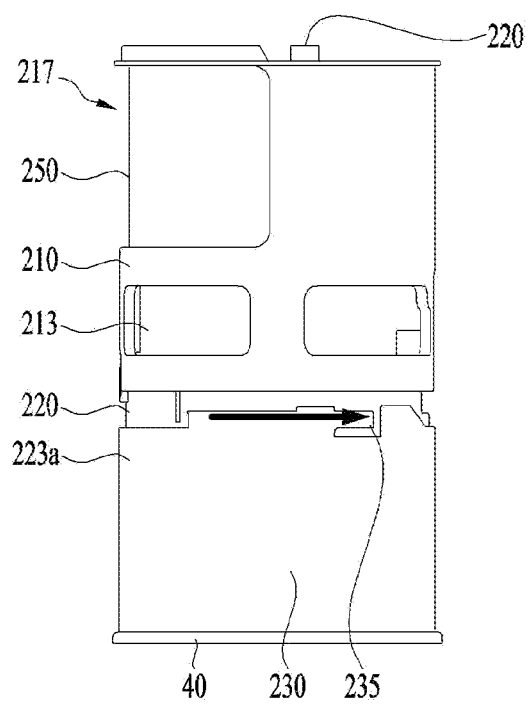
FIGS. 15A-15C are views showing a state change resulting from sliding of an inner housing and a second lower frame according to an embodiment.
Figure 15B:
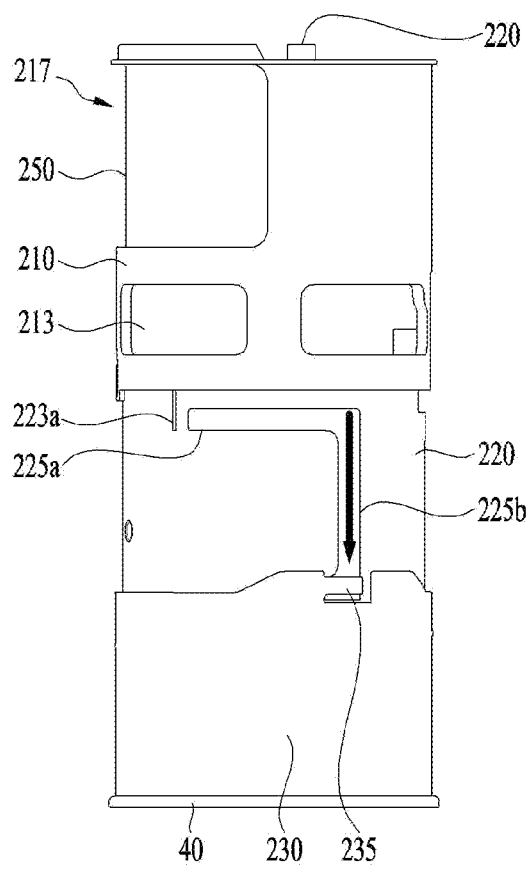
Figure 15C:
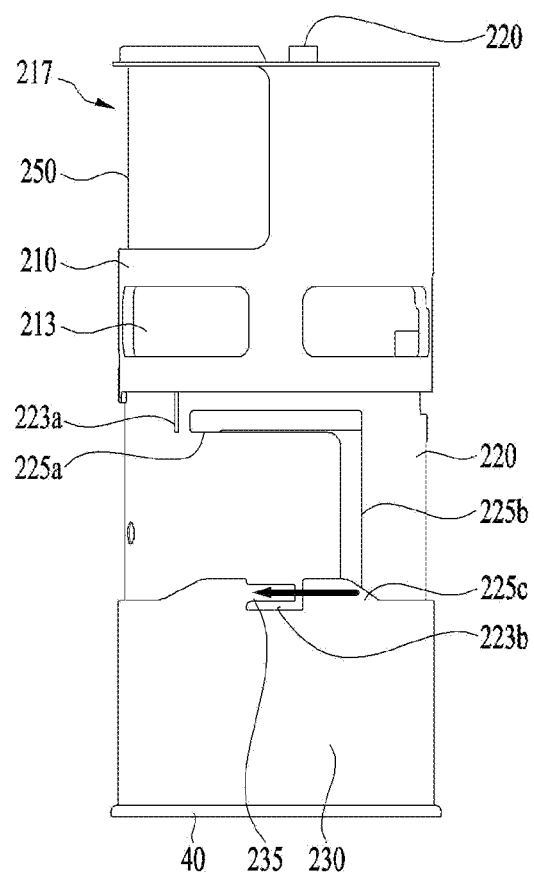

FIGS. 15A-15C are views showing a state change resulting from sliding of an inner housing and a second lower frame according to an embodiment. Referring FIG. 15A, fastening between the sliding fastening portion 233 and the first sliding fastening groove 223a may be released. Thereafter, the sliding portion 235 may be seated in the first sliding groove 225a and slid along the circumferential direction of the second lower frame 220. The sliding portion 235 may move from the second end of the first sliding groove 225a adjacent to the first sliding fastening groove 223a to the first end of the first sliding groove 225a connected to the first end of the second sliding groove 225b. In this case, the inner housing 230 may be released from being fixed with the second lower frame 220, and may be rotated in a clockwise direction or in a counterclockwise direction along the outer wall of the second lower frame 220.

The second housing 20 may be fixed to the inner housing 230, and the first housing 10 and the first frame 100 may be fixed to the second frame 220, so that the first housing 10 and the second housing 20 may be rotated in opposite directions.

The state change described with reference to FIG. 15A may be reversed. In this case, the inner housing 230 may be rotated in the counterclockwise direction or in the clockwise direction along the outer wall of the second lower frame 220, and then, fixed to the second lower frame 220 as the sliding fastening portion 233 and the first sliding fastening groove 223a are fastened to each other.

Referring to FIG. 15B, the sliding portion 235 may be slid along the second sliding groove 225b. The sliding portion 235 may move from the first end of the second sliding groove 225b to the second end of the second sliding groove 225b. In this case, the inner housing 230 may be moved downward along the second direction on the outer wall of the second lower frame 220. Accordingly, the second upper frame 210 may be withdrawn from the second housing 20 to expose the filter assembly 250 to the outside. The second housing 20 may be fixed to the inner housing 230, and the first housing 10 and the first frame 100 may be fixed to the second frame 220, so that the first housing 10 and the second housing 20 may be spaced apart from each other.

The state change described with reference to FIG. 15B may be reversed. In this case, the sliding portion 235 may move from the second end of the second sliding groove 225b to the first end of the second sliding groove 225b. Accordingly, the inner housing 230 may be moved upward along the first direction on the outer wall of the second lower frame 220, and thus, the second upper frame 210 may be introduced into the second housing 20, so that the filter assembly 250 may not be exposed to the outside.

Referring to FIG. 15C, the sliding portion 235 may be seated in the third sliding groove 225c and slid along the circumferential direction of the second lower frame 220. Thereafter, the sliding fastening portion 233 and the second sliding fastening groove 223b may be fastened to each other. The sliding portion 235 may move from the first end of the third sliding groove 225b connected to the second end of the second sliding groove 225b to the second end of the third sliding groove 225b adjacent to the second sliding fastening groove 223b. In this case, the inner housing 230 may be rotated in the counterclockwise direction or in the clockwise direction along the outer wall of the second lower frame 220, and then fixed to the second lower frame 220. The second housing 20 may be fixed to the inner housing 230, and the first housing 10 and the first frame 100 may be fixed to the second frame 220, so that the first housing 10 and the second housing 20 may be rotated in opposite directions.

The state change described with reference to FIG. 15A may be reversed. In this case, as the fastening between the sliding fastening portion 233 and the second sliding fastening groove 223b is released, the inner housing 230 may not be fixed to the second lower frame 220, and may be rotated in the clockwise direction or in the counterclockwise direction along the outer wall of the second lower frame 220.

As a result, FIG. 15A may be understood as a view showing an operation of releasing coupling of the first housing 10 and the second housing 20; FIG. 15B may be understood as a view showing an operation for replacing the filter assembly 250 through the space between the first housing 10 and the second housing 20 after separating the first housing 10 and the second housing 20; and FIG. 15C may be understood as a view showing an operation for temporarily fixing the state in which the first housing 10 and the second housing 20 are separated from each other.

According to FIG. 15A and/or FIG. 15C, the first housing 10, the first frame 100, and the second upper frame 210 may rotate in the clockwise direction or in the counterclockwise direction with respect to the second housing 20 together with the second lower frame 220 when the sliding portion 235 moves along the first sliding groove 225a and/or the third sliding groove 225c. According to FIG. 15B, the first housing 10, the first frame 100, and the second upper frame 210 may ascend from the second housing 20 along the first direction or descend toward the second housing 20 along the second direction together with the second lower frame 220 when the sliding portion 235 moves along the second sliding groove 225b.

As described above, the air cleaner 1 according to embodiments may be configured such that the first housing 10 and the second housing 20 forming the appearance thereof may be spaced apart from each other, and may be configured such that the filter assembly 250 accommodated therein may be replaceable through the space between the first housing 10 and the second housing 20 even when a door for filter replacement is not separately disposed on the first housing 10 or the second housing 20. Therefore, a component for filter replacement may be omitted, and the air cleaner 1 may be configured such that the filter assembly 250 accommodated therein may be easily replaced while having a small and light form for portability.

Hereinafter, a dust sensor cleaning structure according to an embodiment will be described with reference to FIGS. 16 to 18.

Figure 16:
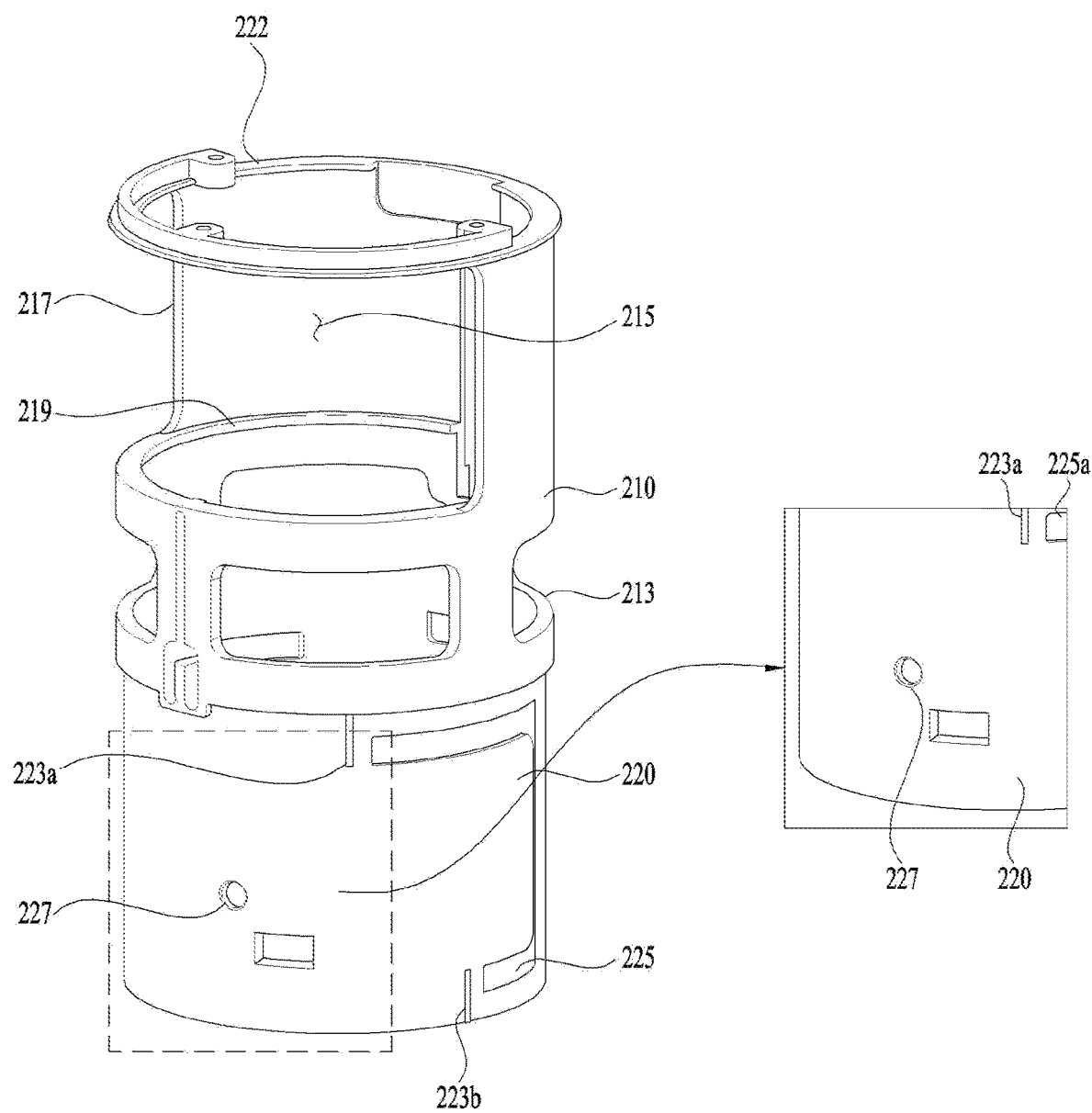
FIGS. 16 to 18 are views showing dust sensor cleaning holes according to an embodiment.
Figure 17:
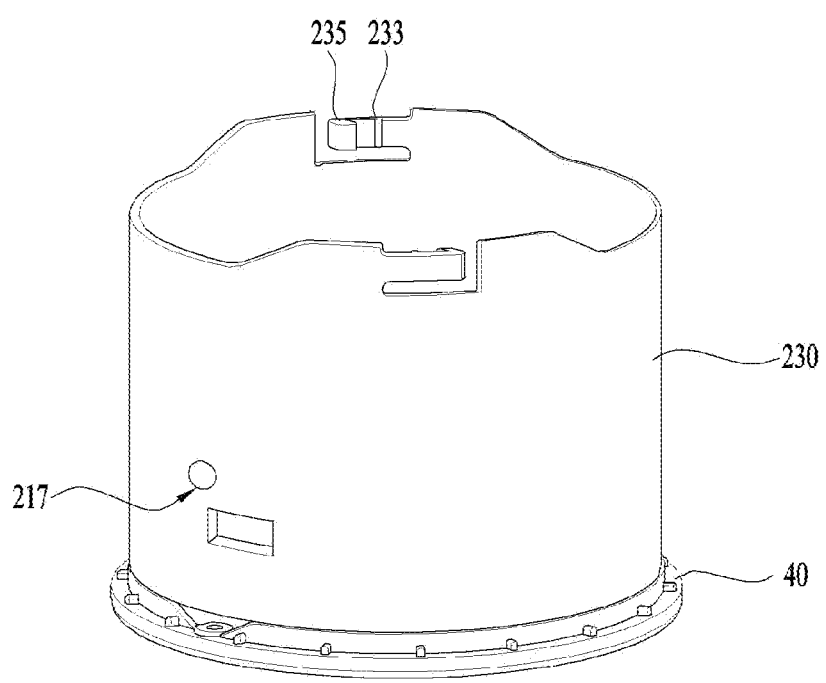
Figure 18:
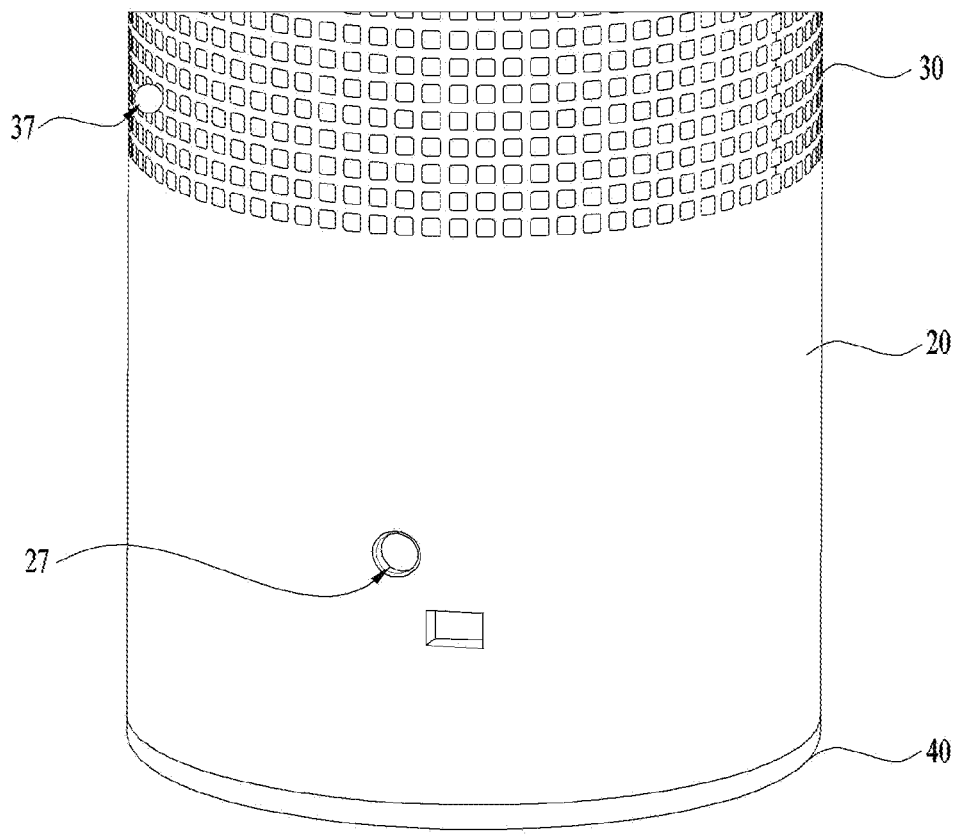

FIGS. 16 to 18 are views showing dust sensor cleaning holes according to an embodiment. Referring to FIGS. 16 to 18, the second frame 200 may further include the first dust sensor cleaning hole 227 that penetrates the sidewall thereof to partially expose the dust sensor assembly 330 accommodated therein, the inner housing 230 may further include the second dust sensor cleaning hole 237 that penetrates the sidewall thereof, and the second housing 20 may further include the third dust sensor cleaning hole 27 that penetrates the sidewall thereof. The first dust sensor cleaning hole 227, the second dust sensor cleaning hole 237, and the third dust sensor cleaning hole 27 may overlap each other in a state in which the fastening portion sliding fastening portion 233 is fastened to the first sliding fastening groove 223a.

Therefore, the dust sensor included in the dust sensor assembly 330 may be exposed to the outside to be able to be cleaned even in a state in which the first housing 10 and the second housing 20 are coupled to each other. The dust accumulated in the dust sensor may sequentially pass through the first dust sensor cleaning hole 227, the second dust sensor cleaning hole 237, and the third dust sensor cleaning hole 27 and be discharged to the outside.

When the dust sensor assembly 330 is accommodated inside of the second sterilizer case 320, the dust sensor exposing portion 333 for cleaning the dust sensor included in the dust sensor assembly 330 may be defined in the side surface frame of the second sterilizer case 320. The dust sensor exposing portion 333 may overlap the first dust sensor cleaning hole 227, the second dust sensor cleaning hole 237, and the third dust sensor cleaning hole 27 in a state in which the sliding fastening portion 233 is fastened to the first sliding fastening groove 223a. Accordingly, dust accumulated in the dust sensor may pass through the dust sensor exposing portion 333, the first dust sensor cleaning hole 227, the second dust sensor cleaning hole 237, and the third dust sensor cleaning hole 27 in sequence and be discharged to the outside.

The second housing 20 may further include a fourth dust sensor cleaning hole 37 that penetrates the sidewall thereof and spaced apart from the third dust sensor cleaning hole 27. The fourth dust sensor cleaning hole 37 may be defined in a portion of the suction inlet 30.

When the suction inlet 30 is formed as the plurality of pixel-shaped through-holes, the fourth dust sensor cleaning hole 37 may be in communication with the plurality of through-holes. The fourth dust sensor cleaning hole 37 may be formed by combining at least two pixel-shaped through-holes with each other. FIG. 18 shows an example in which the fourth dust sensor cleaning hole 37 is defined by four through-holes.

The first dust sensor cleaning hole 227, the second dust sensor cleaning hole 237, and the fourth dust sensor cleaning hole 37 may overlap each other in the state in which the sliding fastening portion 233 is fastened to the second sliding fastening groove 223b. Therefore, the dust sensor included in the dust sensor assembly 330 may be cleaned by being exposed to the outside even in a state in which the first housing 10 and the second housing 20 are spaced apart from each other. The dust accumulated in the dust sensor may sequentially pass through the first dust sensor cleaning hole 227, the second dust sensor cleaning hole 237, and the fourth dust sensor cleaning hole 37 and be discharged to the outside.

When the dust sensor assembly 330 is accommodated inside of the second sterilizer case 320, in the state in which the sliding fastening portion 233 is fastened to the second sliding fastening groove 223b, the dust sensor exposing portion 333 may overlap with the first dust sensor cleaning hole 227, the second dust sensor cleaning hole 237, and the fourth dust sensor cleaning hole 37. Accordingly, dust accumulated in the dust sensor may pass through the dust sensor exposing portion 333, the first dust sensor cleaning hole 227, the second dust sensor cleaning hole 237, and the fourth dust sensor cleaning hole 37 sequentially and be discharged to the outside.

As described above, the air cleaner 1 according to embodiments may further include the dust sensor cleaning holes 227, 237, 27, and 37, which are defined such that the dust sensor assembly 330 accommodated in the air cleaner 1 is able to be cleaned from the outside.

Hereinafter, a flow path reinforcing portion S according to an embodiment of the present disclosure will be described with reference to FIGS. 9A-9B and 16 to 19.

As described above, the airflow formed by the blower 120 is formed to be directed upwards with respect to the suction inlet 30. In other words, most of the air introduced into the housing 10 and 20 through the suction inlet 30 is discharged outside of the housing 10 and 20 through the flow converter 50.

The flow path reinforcing portion S may be understood as a component that defines the flow path of the air flowing through the housing 10 and 20, which is different from the flow path of the air flowing through the suction inlet 30, in order to increase a strength of the air (or a flowrate of the air) flowing through the housing 10 and 20.

The flow path reinforcing portion S may include a first flow path reinforcing portion 29 defined through the second housing 20, a second flow path reinforcing portion 239 defined through the inner housing 230, and a third flow path reinforcing portion 229 defined through the second lower frame 220. When the second housing 20 or the inner housing 230 does not move (when the sliding fastening portion and the first sliding fastening groove are fastened to each other), the flow path reinforcing portion S may be at a position corresponding to the dust sensor inlet 335. When the dust sensor inlet 335 is at a position corresponding to the communication cutout 3235, the air located outside of the housing 10 and 20 may sequentially pass through the first flow path reinforcing portion 29, the second flow path reinforcing portion 239, the third flow path reinforcing portion 229, the communication cutout 3235, and the dust sensor inlet 335 to move into the dust sensor assembly 330.

The first flow path reinforcing portion 29 may be located below the third dust sensor cleaning hole 27. The second flow path reinforcing portion 239 may be located below the second dust sensor cleaning hole 237. The third flow path reinforcing portion 229 may be located below the first dust sensor cleaning hole 227.

The fan (not shown) located inside of the dust sensor body 331 may guide air in the flow path (not shown) defined inside of the dust sensor body 331 to the dust sensor outlet (not shown). Eventually, the air discharged from the dust sensor outlet (not shown) may be purified and discharged to the outside of the housing 10 and 20.

Accordingly, air located outside of the housing 10 and 20 may not only flow into the housing 10 and 20 through the suction inlet 30, but also flow into the housing 10 and 20 through the flow path reinforcing portion S. In addition, the air flowing through the flow path reinforcing portion S may be purified by the sterilizer 300 and the filter assembly 250. That is, the flow path reinforcing portion S may define another air flow path that provides communication between the interior and the exterior of the air cleaner 1. In particular, considering that a strength of the airflow formed by the blower 120 is limited, the flow path reinforcing portion S may increase the amount of air flowing in and out of the housing 10 and 20.

Embodiments disclosed herein provide a portable air cleaner that is small and light for portability and has a separate filter replacement portion for replacing a filter accommodated therein. Embodiments disclosed herein further provide a portable air cleaner in which a housing that forms an exterior of the air cleaner is configured such that upper and lower portions thereof may be separated from each other to define a space, so that a filter accommodated in the housing is replaceable through the space even when a door for filter replacement is not separately disposed. Embodiments disclosed herein furthermore provide a portable air cleaner including a dust sensor cleaning hole defined to clean a dust sensor assembly accommodated therein from the outside.

Embodiments disclosed herein provide an air cleaner that may include a housing including a first housing including a discharge outlet through which air is discharged outside of the air cleaner, and a second housing including a suction inlet through which air is suctioned from the outside of the air cleaner, and a filter assembly accommodated inside of the housing and that filters air. The first housing and the second housing may be spaced apart from each other, and the filter assembly may be replaceable through a space between the first housing and the second housing. The air cleaner may further include a dust sensor assembly accommodated inside of the second housing to sense an amount of dust contained in air, and the second housing may include a dust sensor cleaning hole defined therein for cleaning the dust sensor assembly. Accordingly, the dust sensor assembly may be configured to be cleaned from the outside through the dust sensor cleaning hole even in a state in which it is accommodated inside of the second housing.

Embodiments disclosed herein provide an air cleaner that may include a housing including a suction inlet through which air is suctioned from outside of the air cleaner and a discharge outlet through which air is discharged outside of the air cleaner, a flow converter disposed on a top surface of the housing and that converts a flow of air, that is, changes a flow direction of air, a guide that guides a direction of the flow converter, a sterilizer that sterilizes suctioned air, a filter assembly that filters air, a blower that blows air, a dust sensor assembly that senses an amount of dust contained in air, a battery that supplies power, a frame disposed inside of the housing and that accommodates the sterilizer, the filter assembly, the blower, the dust sensor assembly, and the battery therein, and an inner housing interposed between the housing and the frame. A (first) portion of the inner housing may be fixed to the housing, and the remaining (second) portion thereof may be slidably coupled to the frame. The frame may be configured to move in the housing in a first direction to be closer to the flow converter or in a second direction away from the flow converter by sliding of the inner housing.

The frame may include a first frame for that accommodates the blower therein, and a second frame coupled to the first frame that accommodates the sterilizer, the filter assembly, the dust sensor assembly, and the battery therein. The second frame may include a second upper frame for that accommodates the filter assembly and the sterilizer therein, and a second lower frame for that accommodates the dust sensor assembly and the battery therein. The inner housing may be slidably coupled to an outer wall of the second lower frame.

The housing may include a first housing that covers the first frame, and a second housing for that covers at least a portion of the second frame. The first housing and the second housing may be spaced apart from each other as the inner housing slides against an outer wall of the second lower frame. The first housing may be configured to ascend from the second housing along the first direction or descend toward the second housing along the second direction together with the first frame and the second frame.

The filter assembly accommodated in the second upper frame may be exposed to the outside through a space defined between the first housing and the second housing to be replaced when the second frame ascends along the first direction. The filter assembly may be covered by the second housing so as not to be exposed to the outside when the second frame descends along the second direction.

The second lower frame may include a sliding groove defined in the outer wall of the second lower frame. The inner housing may include a sliding portion configured to be movable along the sliding groove.

The sliding groove may include a first sliding groove that extends along a circumferential direction of the second lower frame, and a second sliding groove that extends along the first direction or the second direction. One or a first end of the first sliding groove may be connected to one or a first end of the second sliding groove, so that the first sliding groove and the second sliding groove are in communication with each other.

The sliding groove may further include a third sliding groove that extends along the circumferential direction and spaced apart from the first sliding groove, and one or a first end of the third sliding groove may be connected to the other or a second end of the second sliding groove, so that the third sliding groove and the second sliding groove are in communication with each other. An extension length of the first sliding groove and an extension length of the third sliding groove may be different from each other.

The second lower frame may be configured to be rotatable in a clockwise direction or in a counterclockwise direction with respect to the second housing when the sliding portion moves along the first sliding groove or the third sliding groove. The second lower frame may be configured to ascend from the second housing along the first direction or descend toward the second housing along the second direction when the sliding portion moves along the second sliding groove.

The second lower frame may further include a sliding fastening groove defined in the outer wall of the second lower frame, and the inner housing may further include a sliding fastening portion configured to be fastened to the sliding fastening groove. The sliding portion and the sliding fastening portion may be disposed to be in parallel with each other.

The sliding fastening groove may include a first sliding fastening groove defined at an upper portion of the outer wall of the second lower frame, and a second sliding fastening groove defined at a lower portion of the outer wall of the second lower frame, and the second lower frame may be prevented from rotating in a clockwise direction or in a counterclockwise direction with respect to the second housing as the sliding fastening portion is fastened to the first sliding fastening groove or the second sliding fastening groove. At least a portion of the first sliding fastening groove may be defined in parallel with the first sliding groove, and at least a portion of the second sliding fastening groove may be defined in parallel with the third sliding groove.

The filter assembly may be fixed in a state of being exposed to the outside through a space defined between the first housing and the second housing when the sliding fastening portion is fastened to the second sliding fastening groove. The filter assembly may be fixed in a state of being covered by the second housing and not being exposed to the outside when the sliding fastening portion is fastened to the first sliding fastening groove.

Embodiments disclosed herein provide an air cleaner that may include a housing including a suction inlet through which air is suctioned from outside of the air cleaner and a discharge outlet through which air is discharged outside of the air cleaner, a flow converter disposed on a top surface of the housing and that converts a flow of air, a guide that guides a direction of the flow converter, a sterilizer that sterilizes suctioned air, a filter assembly that filters air, a blower that blows air, a dust sensor assembly that senses an amount of dust contained in air, a battery that supplies power, a first frame disposed inside of the housing and that accommodates the blower therein, a second frame disposed inside of the housing and beneath the first frame, the second frame accommodating the sterilizer, the filter assembly, the dust sensor assembly, and the battery therein, and an inner housing interposed between the housing and the second frame, a (first) portion of the inner housing being fixed to the housing, and the remaining (second) portion thereof being slidably coupled to the second frame. The housing may include a first housing that covers the first frame, and a second housing that covers at least a portion of the second frame. The second frame may include a sliding groove that penetrates an outer wall of the second frame, the inner housing may include a sliding portion configured to be movable along the sliding groove, and the inner housing may be configured to be slidable with respect to the second frame as the sliding portion moves along the sliding groove. The second frame may further include a first sliding fastening groove and a second sliding fastening groove defined at different positions of the outer wall of the frame, and the inner housing may further include a sliding fastening portion capable of being selectively fastened to the first sliding fastening groove or the second sliding fastening groove.

The second frame may further include a first dust sensor cleaning hole that penetrates a sidewall of the second frame to partially expose the dust sensor assembly accommodated in the second frame. The inner housing may further include a second dust sensor cleaning hole that penetrates a sidewall of the inner housing. The second housing may include a third dust sensor cleaning hole that penetrates a sidewall of the second housing. The first dust sensor cleaning hole, the second dust sensor cleaning hole, and the third dust sensor cleaning hole may overlap each other in a state in which the sliding fastening portion is fastened to the first sliding fastening groove.

The second housing may further include a fourth dust sensor cleaning hole that penetrates the sidewall of the second housing and spaced apart from the third dust sensor cleaning hole. The first dust sensor cleaning hole, the second dust sensor cleaning hole, and the fourth dust sensor cleaning hole may overlap each other in a state in which the sliding fastening portion is fastened to the second sliding fastening groove. The fourth dust sensor cleaning hole may be included in a portion of the suction inlet.

The portable air cleaner according to embodiments disclosed herein may have the housing that forms the exterior of the air cleaner and is configured such that upper and lower portions thereof may be separated from each other to define the space, so that the filter accommodated in the housing is replaceable through the space defined between the upper and lower portions even when the door for filter replacement is not separately disposed. Thus, the air cleaner may be small and light for portability and may be configured such that the filter accommodated therein may be easily replaced. In addition, the air cleaner may further include the dust sensor cleaning hole defined to clean the dust sensor assembly accommodated therein from the outside.

Although embodiments disclosed herein have been described above, those of ordinary skill in the technical field to which the embodiments pertain will understand that various modifications are possible with respect to the above-described embodiments without departing from the scope. Therefore, the scope of rights should not be limited to the described embodiment and should be defined by the claims described later as well as the claims and equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner, comprising:
    a housing including a suction inlet through which air is suctioned from outside of the air cleaner and a discharge outlet through which air is discharged outside of the air cleaner;
    a flow converter disposed on a top surface of the housing that changes a flow direction of air;
    a guide that guides a direction of the flow converter;
    a sterilizer that sterilizes air suctioned into the air cleaner;
    a filter assembly that filters the air suctioned into the air cleaner;
    a blower that blows air;
    a dust sensor assembly that senses an amount of dust contained in the air suctioned into the air cleaner;
    a battery that supplies power;
    a frame disposed inside of the housing that accommodates the sterilizer, the filter assembly, the blower, the dust sensor assembly, and the battery therein; and
    an inner housing interposed between the housing and the frame, wherein a first portion of the inner housing is fixed to the housing, and a second portion thereof is slidably coupled to the frame, and wherein the frame is configured to move in the housing in a first direction to be closer to the flow converter or in a second direction away from the flow converter by sliding of the inner housing.

2. The air cleaner of claim 1, wherein the frame includes:
    a first frame that accommodates the blower therein; and
    a second frame coupled to the first frame and that accommodates the sterilizer, the filter assembly, the dust sensor assembly, and the battery therein, wherein the second frame includes:
        an upper frame that accommodates the filter assembly and the sterilizer therein; and
        a lower frame that accommodates the dust sensor assembly and the battery therein, wherein the inner housing is slidably coupled to an outer wall of the lower frame.

3. The air cleaner of claim 2, wherein the housing includes:
    a first housing that covers the first frame; and
    a second housing that covers at least a portion of the second frame, wherein the first housing and the second housing are spaced apart from each other as the inner housing slides with respect to the outer wall of the lower frame.

4. The air cleaner of claim 3, wherein the first housing is configured to ascend from the second housing along the first direction or descend toward the second housing along the second direction together with the first frame and the second frame.

5. The air cleaner of claim 4, wherein the filter assembly accommodated in the upper frame is exposed to the outside through a space defined between the first housing and the second housing to be replaced when the second frame ascends along the first direction.

6. The air cleaner of claim 4, wherein the filter assembly is covered by the second housing so as not to be exposed to the outside when the second frame descends along the second direction.

7. The air cleaner of claim 3, wherein the lower frame includes a sliding groove defined in the outer wall of the lower frame, and wherein the inner housing includes a sliding portion configured to be movable along the sliding groove.

8. The air cleaner of claim 7, wherein the sliding groove includes:
a first sliding groove that extends along a circumferential direction of the lower frame; and
a second sliding groove that extends along the first direction or the second direction, wherein a first end of the first sliding groove is connected to a first end of the second sliding groove, so that the first sliding groove and the second sliding groove are in communication with each other.

9. The air cleaner of claim 8, wherein the sliding groove further includes a third sliding groove that extends along the circumferential direction and spaced apart from the first sliding groove, wherein a first end of the third sliding groove is connected to a second end of the second sliding groove, so that the third sliding groove and the second sliding groove are in communication with each other.

10. The air cleaner of claim 9, wherein an extension length of the first sliding groove and an extension length of the third sliding groove are different from each other.

11. The air cleaner of claim 9, wherein the lower frame is configured to be rotatable in a clockwise direction or in a counterclockwise direction with respect to the second housing when the sliding portion moves along the first sliding groove or the third sliding groove, and wherein the lower frame is configured to ascend from the second housing along the first direction or descend toward the second housing along the second direction when the sliding portion moves along the second sliding groove.

12. The air cleaner of claim 9, wherein the lower frame further includes a sliding fastening groove defined in the outer wall of the second lower frame, and wherein the inner housing further includes a sliding fastening portion configured to be fastened to the sliding fastening groove.

13. The air cleaner of claim 12, wherein the sliding portion and the sliding fastening portion are disposed to be in parallel with each other.

14. The air cleaner of claim 12, wherein the sliding fastening groove includes:
a first sliding fastening groove defined at an upper portion of the outer wall of the lower frame; and
a second sliding fastening groove defined at a lower portion of the outer wall of the lower frame, wherein the lower frame is prevented from rotating in a clockwise direction or in a counterclockwise direction with respect to the second housing as the sliding fastening portion is fastened to the first sliding fastening groove or the second sliding fastening groove.

15. The air cleaner of claim 14, wherein at least a portion of the first sliding fastening groove is disposed to be in parallel with the first sliding groove, and wherein at least a portion of the second sliding fastening groove is disposed to be in parallel with the third sliding groove.

16. The air cleaner of claim 14, wherein the filter assembly is fixed in a state of being exposed to the outside through a space defined between the first housing and the second housing when the sliding fastening portion is fastened to the second sliding fastening groove, and wherein the filter assembly is fixed in a state of being covered by the second housing and not exposed to the outside when the sliding fastening portion is fastened to the first sliding fastening groove.

17. An air cleaner, comprising:
a housing including a suction inlet through which air is suctioned from outside of the air cleaner and a discharge outlet through which air is discharged outside of the air cleaner;
a flow converter disposed on a top surface of the housing that changes a flow direction of air;
a guide that guides a direction of the flow converter;
a sterilizer that sterilizes air suctioned into the air cleaner;
a filter assembly that filters the air suctioned into the air cleaner;
a blower that blows air;
a dust sensor assembly that senses an amount of dust contained in the air suctioned into the air cleaner;
a battery that supplies power;
a first frame disposed inside of the housing that accommodates the blower therein;
a second frame disposed inside of the housing and beneath the first frame, wherein the second frame accommodates the sterilizer, the filter assembly, the dust sensor assembly, and the battery therein; and
an inner housing interposed between the housing and the second frame, wherein a first portion of the inner housing is fixed to the housing, and a second portion thereof is slidably coupled to the second frame, wherein the housing includes a first housing that covers the first frame, and a second housing that covers at least a portion of the second frame, wherein the second frame includes a sliding groove defined to penetrate an outer wall of the second frame, wherein the inner housing includes a sliding portion configured to be movable along the sliding groove, wherein the inner housing is configured to be slidable with respect to the second frame as the sliding portion moves along the sliding groove, wherein the second frame further includes a first sliding fastening groove and a second sliding fastening groove defined at different positions of the outer wall of the second frame, and wherein the inner housing further includes a sliding fastening portion capable of being selectively fastened to the first sliding fastening groove or the second sliding fastening groove.

18. The air cleaner of claim 17, wherein the second frame further includes a first dust sensor cleaning hole that penetrates a sidewall of the second frame to partially expose the dust sensor assembly accommodated in the second frame, wherein the inner housing further includes a second dust sensor cleaning hole that penetrates a sidewall of the inner housing, wherein the second housing includes a third dust sensor cleaning hole that penetrates a sidewall of the second housing, and wherein the first dust sensor cleaning hole, the second dust sensor cleaning hole, and the third dust sensor cleaning hole overlap each other in a state in which the sliding fastening portion is fastened to the first sliding fastening groove.

19. The air cleaner of claim 18, wherein the second housing further includes a fourth dust sensor cleaning hole that penetrates the sidewall of the second housing and spaced apart from the third dust sensor cleaning hole, and wherein the first dust sensor cleaning hole, the second dust sensor cleaning hole, and the fourth dust sensor cleaning hole overlap each other in a state in which the sliding fastening portion is fastened to the second sliding fastening groove.

20. The air cleaner of claim 19, wherein the fourth dust sensor cleaning hole is defined in a portion of the suction inlet.

21. An air cleaner, comprising:
a housing including a first housing having a suction inlet through which air is suctioned from outside of the air cleaner and a second housing having a discharge outlet through which air is discharged outside of the air cleaner;
a flow converter disposed on a top surface of the housing that changes a flow direction of air;
a guide that guides a direction of the flow converter;
a sterilizer that sterilizes air suctioned into the air cleaner;
a filter assembly that filters the air suctioned into the air cleaner;
a blower that blows air;
a dust sensor assembly that senses an amount of dust contained in the air suctioned into the air cleaner;
a battery that supplies power;
a frame disposed inside of the housing that accommodates the sterilizer, the filter assembly, the blower, the dust sensor assembly, and the battery therein; and
an inner housing interposed between the housing and the frame and configured to slide with respect to the frame to provide access to the filter assembly when the first housing and the second housing are separated from one another.

* * * * *